United States Patent [19]

Sakaizawa et al.

[11] Patent Number: 5,734,390
[45] Date of Patent: Mar. 31, 1998

[54] IMAGE FORMING APPARATUS

[75] Inventors: Katsuhiro Sakaizawa, Kawasaki; Noboru Koumura, Narashino; Yasushi Sato; Yukihide Ushio, both of Kawasaki; Izumi Narita, Inagi; Yukihiro Ohzeki; Naohiro Nakane, both of Yokohama; Kenji Muto, Kawasaki; Kenya Ogawa; Yasunori Chigono, both of Yokohama; Kazunori Taira, Machida, all of Japan

[73] Assignee: Canon Kabushiki Kaisha, Tokyo, Japan

[21] Appl. No.: 520,557

[22] Filed: Aug. 28, 1995

[30] Foreign Application Priority Data

Aug. 31, 1994 [JP] Japan ................... 6-207206

[51] Int. Cl.⁶ .................................. G01D 15/16
[52] U.S. Cl. ........................................ 347/2
[58] Field of Search ................ 346/1.1, 2, 75, 346/140; 417/207–209, 52; 60/531; 165/104.29

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 4,814,886 | 3/1989 | Kuge et al. | 358/293 |

FOREIGN PATENT DOCUMENTS

| | | |
|---|---|---|
| 54-56847 | 5/1979 | Japan. |
| 59-123670 | 7/1984 | Japan. |
| 59-138461 | 8/1984 | Japan. |
| 60-71260 | 4/1985 | Japan. |

*Primary Examiner*—Aditya Krishnan
*Attorney, Agent, or Firm*—Fitzpatrick, Cella, Harper & Scinto

[57] ABSTRACT

A hybrid type image forming apparatus capable of forming a high quality image by using two image forming units having different resolution from each other, perform high throughput image forming by selecting most suitable image forming method or methods depending upon a kind of input image data, and reducing its running cost. In the apparatus, input image data of resolution of 300 dpi is separated into monochromatic image data and color image data. The monochromatic image data is converted into that of 600 dpi so that four pixels of an image of 600 dpi make one pixel of an image of 300 dpi. Then, a monochromatic image is formed on the basis of the monochromatic image data of 600 dpi by the image forming unit employing the electrophotograph method. A print medium on which the monochromatic image is formed is conveyed to the image forming unit employing the ink-jet printing method where a color image is formed on the basis of the color image data of 300 dpi.

26 Claims, 14 Drawing Sheets

IMAGE FORMING APPARATUS

BACKGROUND OF THE INVENTION

This invention relates to an image forming apparatus and, more particularly, to an image forming apparatus having a plurality of image forming units which employ different image forming methods from each other.

Use of image forming apparatuses, such as copy machines and printers, is very frequent in offices and other places, thus many efforts have been made to improve quality of image and to increase printing speed of the image forming apparatuses. Recently, color image processing technology was introduced to the image forming apparatuses, and demand for color copy machines and color printers is increasing. However, not only price but also maintenance cost of an image forming apparatus capable of performing color image printing (color printing apparatus) are higher than those of an image forming apparatus capable of performing only monochromatic printing (monochromatic printing apparatus). Moreover, printing speed of the color printing apparatus is slower than the monochromatic printing apparatus.

Therefore, color copy machines and color printers of hybrid type comprising a plurality of image forming units, each employing different image forming methods, and using combinations of these units were proposed recently. FIG. 14 shows a typical configuration of a printing apparatus like the one described above. As shown in FIG. 14, this printing apparatus has an image forming unit C employing an electrophotograph method and an image forming unit D employing an ink-jet printing method, where the former includes a charger 51, an exposure unit 53, a transfer unit 54, and so on, provided around an electrostatic drum 50 and fixes toner transferred to a print medium 59 by a heat fixing unit 55, and the latter performs color printing by using an ink-jet head 56 having a plurality of nozzles. The printing apparatus is constructed so that the print medium 59 is conveyed from the image forming unit C to the image forming unit D.

The printing apparatus having aforesaid configuration forms a black and white image by taking advantage of the electrophotograph method, i.e., an image can be formed in high quality and at high speed by using the image forming unit C when performing black and white printing. Whereas, when color printing is to be performed, the printing apparatus forms a color image by taking advantage of the ink-jet printing method, i.e., a color image can be formed with low cost by using the image forming unit D. Thereby, it is possible to provide an image forming apparatus capable of performing color printing with lower cost than a color image forming apparatus employing the electrophotograph method, and also capable of performing black and white printing of higher quality and at higher speed than an image forming apparatus employing the ink-jet printing method.

However, in the aforesaid conventional example, there are the following problems caused by difference of printing resolutions of the image forming units.

The "printing resolution" here means resolution of an image to be formed on print medium, such as a printing paper sheet, and more specifically, indicates number of dots which can be printed in a unit length (e.g., number of dots per inch (dpi)). Strictly, two resolutions can be defined: one is measured in the conveyance direction of a print medium (in the sub-scanning direction) and the other is measured in the direction perpendicular to the sub-scanning direction (in the main scanning direction). However, the resolutions in the sub-scanning direction and in the main scanning direction are assumed same hereinafter, if not mentioned as being different.

In the electrophotograph method, there are two known methods, namely (1) a laser exposure method and (2) an LED exposure method. In the laser exposure method, when a spot diameter and light amount of a laser beam, productivity of a laser element, and demand for better image quality are taken into consideration, resolution of 600 dpi or 300 dpi is commonly employed. Regarding the LED exposure method, by taking productivity of LED elements and focal lenses into consideration, resolution of 300 dpi is mainly used.

In contrast, in an ink-jet printing method, resolution of 360 dpi and 400 dpi is generally employed when plasticity of printheads and demand for better image quality are taken into consideration.

As described above, resolutions of different image forming methods vary, therefore, (1) In a case where print control signals are sent from a host computer (called "host", hereinafter) to the printing apparatus and print data is subsequently sent, if it is assumed that resolution of the image forming unit C, employing the electrophotograph method, of the printing apparatus shown in FIG. 14 is 300 dpi and the resolution of the image forming unit D, employing the color ink-jet printing method, is 360 dpi, then, since the resolutions of the image forming units C and D differ from each other, the host has to generate data in resolution of 300 dpi for the image forming unit C and data in resolution of 360 dpi for the image forming unit D. As a result, the host suffers from heavy load for data processing, and takes a long time to process the data, thus printing speed, as total throughput, becomes very slow.

(2) In a case where colored characters are formed so as to emphasize a part of a black text with white background, sizes of the colored characters and of the black characters as well as intervals between the colored characters and between the black characters differ, as apparent from FIGS. 15A and 15B, where FIG. 15A shows a black letter "E" formed by the image forming unit C, employing the electrophotograph method, whose resolution is 300 dpi, and FIG. 15B shows a letter "E" formed by the image forming unit D, employing the ink-jet printing method, whose resolution is 360 dpi. Therefore, the outputted image may not look attractive. Further, since the sizes of the colored and black characters differ from each other, the colored characters will be printed at slightly upper or lower positions with respect to a reference line of the black characters, thus alignment of characters becomes worse.

(3) In a case where a black character is to be enhanced by surrounding its character pattern with a particular color, some portions as borders between an area formed by the image forming unit C and an area formed by the image forming unit D may remain unprinted. As a result, a color of printing paper, namely a background color, appears in the unprinted portions. In such case, a high quality image forming can not be achieved.

SUMMARY OF THE INVENTION

Accordingly, it is an object of the present invention to provide an image forming apparatus, having a plurality of image forming units, employing different image forming methods, which achieves high throughput and which is capable of performing high quality image forming even in a case where a color image and a black and white image are to be printed in a single page.

According to the present invention, the foregoing object is attained by providing an image forming apparatus comprising: input means for inputting image data from an external device; analyzing means for analyzing kinds of image data included in the image data inputted by the input means; first image forming means for forming an image in first resolution in a first image forming method by using the image data inputted by the input means; second image forming means for forming another image in second resolution which is different from the first resolution in a second image forming method by using the image data inputted by the input means; selecting means for controlling to perform image forming by selecting either the first image forming means or both of the first and second image forming means; and image conversion means for performing image conversion so that a size of an image formed by the first image forming means is visually the same as a size of an image formed by the second image forming means when the image forming is to be performed by using both of the first and second image forming means in accordance with a selection result by the selecting means.

According to another aspect of the present invention, the foregoing object is attained by providing an image forming apparatus comprising: input means for inputting image data from an external device; analyzing means for analyzing kinds of image data included in the image data inputted by the input means; first image forming means for forming an image in first resolution in a first image forming method by using the image data inputted by the input means; and second image forming means for forming another image in second resolution which is different from the first resolution in a second image forming method by using the image data inputted by the input means, wherein the first resolution is multiple number of the second resolution by an integer.

In accordance with the present invention as described above, in order to form an image by using the first and the second image forming means on the basis of the analyzed result regarding image data types included in an input image data, the image forming apparatus of the present invention performs size conversion on the input image data so that the apparent size of the image formed by the first image forming means which performs image forming in high resolution and at high speed becomes about the same as the apparent size of the image formed by the second image forming means which performs image forming in low resolution and by using inexpensive printing materials.

The invention is particularly advantageous since images formed by a plurality of image forming means whose resolutions are different from each other are about same size. For example, if the images are character images, a line of characters is aligned, and the sizes of characters and the intervals between characters are apparently uniform, as a result, obtaining a high quality image.

Further, depending on a type of the input image data, some images can be formed at high speed and in high resolution, thus achieving an image forming process of high total throughput. For example, when the input image data is monochromatic image data, by using the first image forming means, it is possible to obtain a monochromatic image of high quality at high speed.

Furthermore, depending on the type of the input image data, it is possible to control the forming of an image by using inexpensive printing materials, thereby realizing to perform economical image forming which reduces running cost. For example, when input data is mixture data of monochromatic image data and color image data, by forming the color image by the second image forming means, an image can be formed with inexpensive printing materials, thereby obtaining the color image at low cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<Common Embodiment>

A configuration and functional features of a printing apparatus which is to be commonly used in the following embodiments that will be described later will be explained below.

Figure 1:
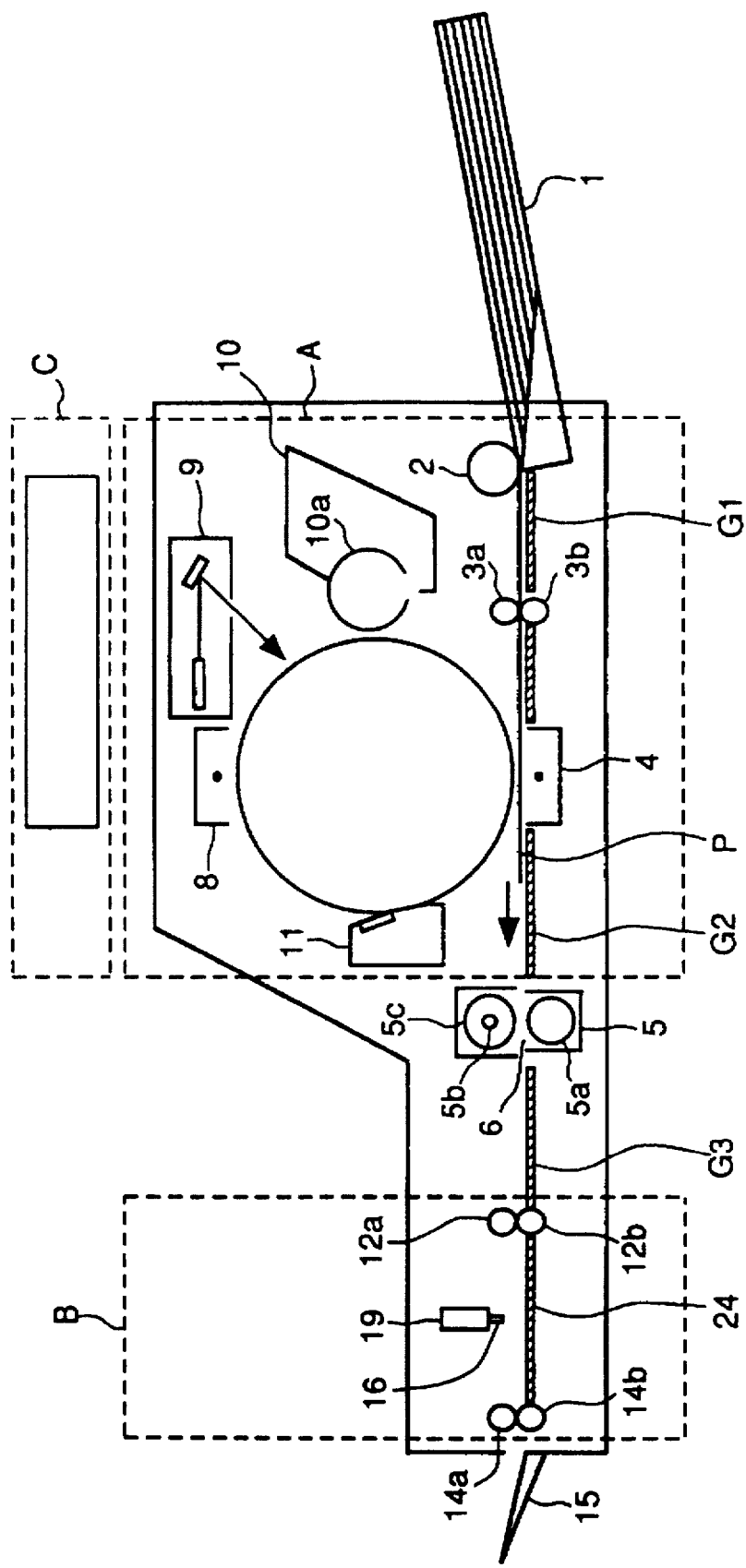
FIG. 1 is a cross-sectional view illustrating a configuration of a printing apparatus having two image forming units which employ two different image forming methods as a typical embodiment of the present invention.

FIG. 1 is a cross-sectional view illustrating a configuration of a printing apparatus having two image forming units which employ two different image forming methods as a typical embodiment of the present invention. As shown in FIG. 1, a printing apparatus 100 consists of an image forming unit A, an image forming unit B, and a printer controller C. The image forming unit A employs the electrophotograph method (laser exposure method) and performs black and white image forming in resolution of maximum 600 dpi, the image forming unit B employs ink-jet printing method and performs color image forming in resolution of maximum 300 dpi, and the printer controller C which includes microprocessor that controls the image forming unit. A and the image forming unit B receives image data sent from a host computer (called "host", hereinafter) and processes it.

The printer controller C receives monochromatic image data, color image data, or mixed data of these two kinds, which is formed in a pre-fixed resolution, from the host. In this embodiment, it is assumed that the resolution of the image data which is generated in and sent from the host is 300 dpi. When the print data is transferred from the host, the printer controller C separates the data into text data of 300 dpi to be formed by the image forming unit A and color image data of 300 dpi to be formed by the image forming unit B.

(Configuration of the Image Forming Unit A)

The image forming unit A is mainly for black and white printing, and prints an image in the following manner. First, a latent image is formed on an electrostatic drum 7, an image holding member, by illuminating a laser beam which is controlled in accordance with image information, then the latent image is visualized by a developing unit 10 thereby forming an image with a developer (called "toner image", hereinafter). In synchronization with forming of the toner image, a print medium P is conveyed from a cassette 1 by using a pickup roller 2, guiding member G1, a pair of resist rollers 3a and 3b, and the like, then the toner image formed on the electrostatic drum 7 is transferred onto the print medium P by using a transfer charger 4 which is applied with voltage, and the print medium P is conveyed to a fixing unit 5 via a guiding member G2. The fixing unit 5 includes a pressing roller 5a and a fixing roller 5c which includes a heater 5b and is driven by a driving motor (not shown), and it fixes the transferred toner image on the print medium P by applying heat and pressure on the print medium P while it is passing through the fixing unit 5. Thereafter, the print medium P is ejected from an ejecting unit 6 and conveyed to the image forming unit B.

The image forming unit A performs image forming in the following manner. First, as shown in FIG. 1, an electrostatic drum 7 having a photosensitive layer is rotated, and its surface is uniformly charged by a primary charger 8 on which a voltage is applied. Then, the electrostatic drum 7 is exposed by an exposure unit 9, thereby forming a latent image. A possible resolution of an image by using a laser beam in this embodiment is 600 dpi. The formed electrostatic latent image is developed by a developing unit 10. The developing unit 10 then forms a toner layer on the surface of the developing sleeve 10a, and the toner is transferred to the electrostatic drum 7 depending on the formed latent image, thereby forming to visualize a toner image. After the toner image is transferred to print medium P by applying an opposite voltage to the voltage of the toner image, residual toner on the electrostatic drum 7 is removed by a cleaning unit 11.

(Configuration of the Image Forming Unit B)

Figure 2:
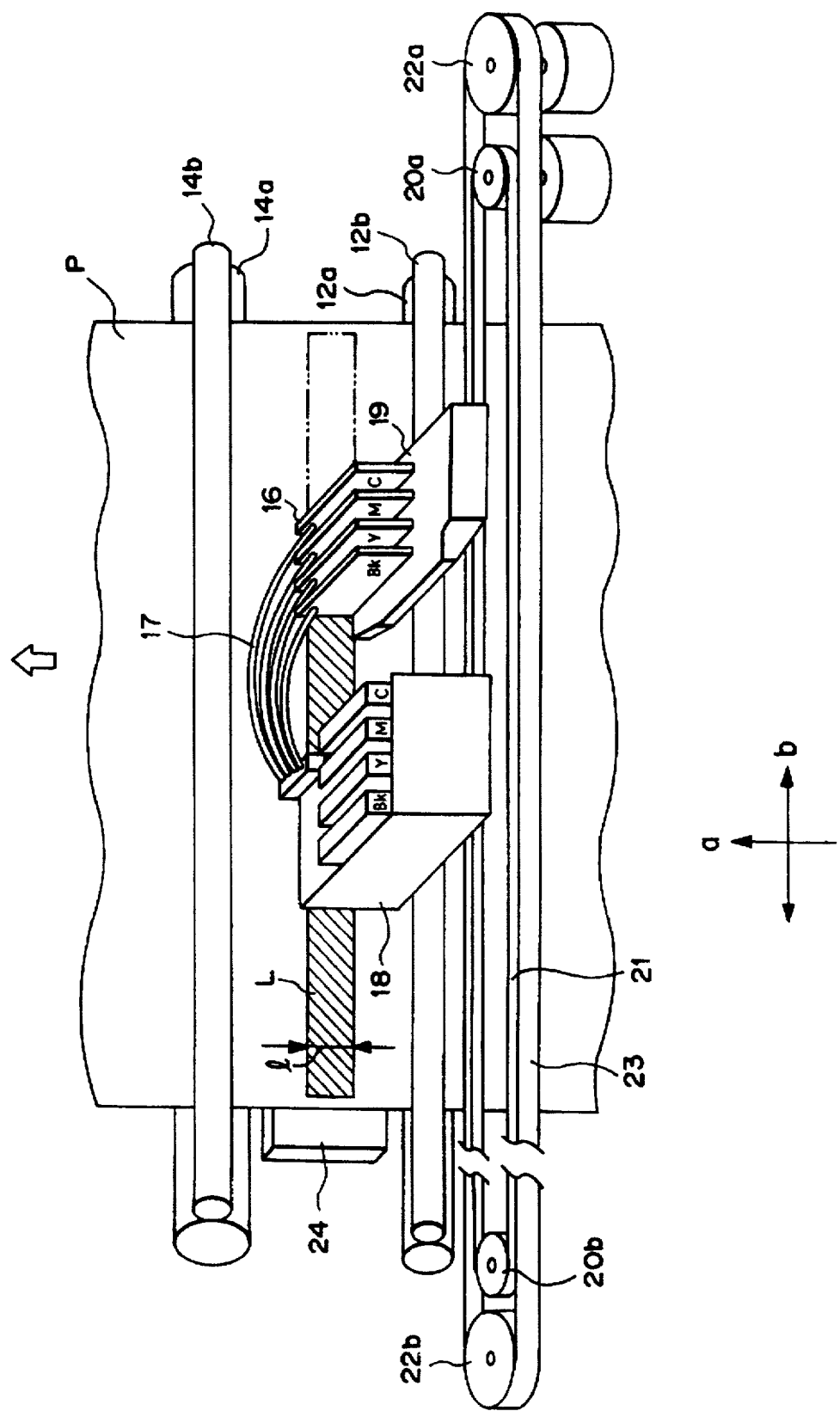
FIG. 2 is a three-dimensional external view illustrating a detailed configuration of a part around a printhead.

The image forming unit B is mainly for color printing, and its brief configuration is shown in FIG. 1, and detailed configuration around its printhead is shown as a three-dimensional external view in FIG. 2.

The print medium P ejected from the ejecting unit 6 is conveyed via a guiding member G3 and a pair of conveying rollers 12a and 12b. After printing on the print medium is completed, it is ejected to a tray 15 by a pair of ejecting rollers 14a and 14b.

The image printing in the image forming unit B is based on the ink-jet printing method: an image is recorded by discharging ink in accordance with image signals from a printhead 16, installed on a carriage 19 which moves forward and backward in the vertical direction (main scanning direction) with respect to the conveyance direction of the print medium P. The printhead 16 has fine droplet discharging orifices, liquid paths, an energy conductor provided on a part of the liquid paths, and an energy generator for generating droplet formation energy to be transferred to the ink in the energy conductor. Since the resolution of the droplet discharging orifices is 300 dpi, the distance between the center of one droplet discharging orifice and the center of the next droplet discharging orifice is about 84.7 μm.

As printing methods which generates the droplet formation energy, there are a printing method using an electromechanical transducer such as a piezoelectric element, a printing method discharging droplets by using heat generated by an electromagnetic wave such as a laser beam, and a printing method in which an electrothermal transducer, such as a heater having a resistor, heats liquid thereby discharging droplets.

Among the above-described methods, a printhead used in the ink-jet printing method in which droplets are discharged by using thermal energy can be utilized to record in high resolution since droplet discharging orifices for forming droplets for printing by discharging liquid can be arranged in high density. Especially, a printhead using the electrothermal transducer for generating the droplet formation energy can be easily down-sized, effectively applied with IC technology and microprocessing technology both of which have been made rapid progress and whose reliability has been improved noticeably recently, easily packaged in high density, and produced at low cost. Therefore, it is advantageous to use such the printhead.

AS shown in FIG. 2, the printhead 16 used in this embodiment has a plurality of ink discharging nozzles arranged in the direction of an arrow a (subscanning direction), and is composed of heads for color ink of cyan (C), magenta (M), yellow (Y), and black (BK). Each color ink is supplied to the printhead 16 from an ink tank 18 through an ink supply tube 17. The printhead 16 is installed on the carriage 19 which is fixed on a portion of a belt expandedly provided between a driving pulley 20a and an associated pulley 20b and which is moved in high precision in the direction of an arrow b (main scanning direction) along a guiding rod (not shown).

The ink tank 18 is fixed on a part of a belt 23 provided between a driving pulley 22a and a associated pulley 22b, and can be moved in the direction of the arrow b (main scanning direction) along the guiding rod (not shown) as in the case of the printhead 16. While the printhead 16 moves 25.4 mm (1 inch) in the direction of the arrow b along the guiding rod, one liquid discharging nozzle is able to discharge ink 300 times. By removing stress applied on the ink supply tube 17 and driving the ink supply tube differently from the carriage 19, vibration caused by movement of the somewhat heavy ink tank 18 is prevented from propagating to the printhead 16.

The print medium P is pinched and held by the pair of conveying rollers 12a and 12b and the pair of ejecting rollers 14a and 14b. Printing is performed by the printhead 16 between the pair of rollers 12a and 12b and the pair of rollers 14a and 14b. Note that conveying speed by the pair of ejecting rollers 14a and 14b is set slightly faster than conveying speed by the pair of conveying rollers 12a and 12b so that the print medium P is kept flat between these pairs. Further, it is also possible to attract the print medium P on a flat portion of a platen 24 by using electrostatic force or suction force by air in order that the print medium P maintains its flat shape.

On the print medium P which remains stationary while being printed, image printing, shown as a printing line L in FIG. 2, by the printhead 16 starts from the left edge of the print medium P on the basis of image signals and to the right edge. After one line printing is completed, the carriage 19 and the ink tank 18 returns to the left edge. Meanwhile, the print medium P is conveyed by one line in the direction of the arrow a by the pair of the conveying rollers 12a and 12b and the pair of the discharging rollers 14a and 14b, then stops.

By repeating the above-described operation, color printing is performed on the print medium P.

As described above, clear black and white printing is performed in the electrophotograph method by the image forming unit A and, after the print medium P is conveyed to the image forming unit B, inexpensive color printing is in the ink-jet printing method by the image forming unit B.

(Configuration of the Printer Controller C)

Figure 3:
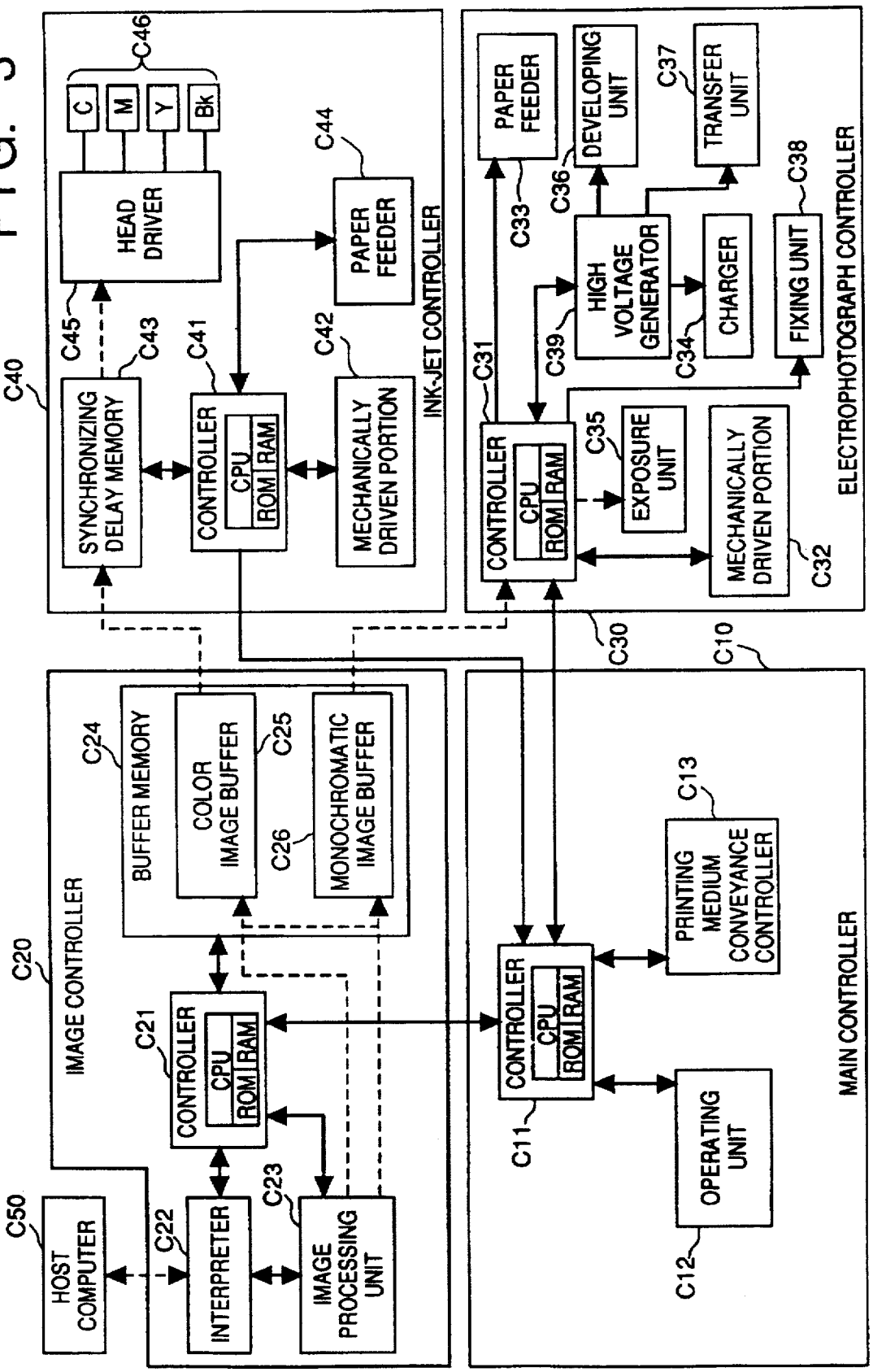
FIG. 3 is a block diagram showing a configuration of a printer controller C which controls operation of an image forming unit A and an image forming unit B.

FIG. 3 is a block diagram showing the printer controller C controlling operations of the image forming units A and B.

The printer controller C comprises a main controller C10 for controlling the overall printing apparatus, an image controller C20 for controlling image data reception from the host and for performing image processings on the image data, an electrophotograph controller C30 for controlling the image forming unit A, and an ink-jet controller C40 for controlling the image forming unit B. Controller C11 of the main controller C10, controller C21 of the image controller C20, controller C31 of the electrophotograph controller C30, and controller C41 of the ink-jet controller C40 are composed of CPU for performing necessary operations and decisions, ROM for storing various programs and the like which the CPU operates, RAM used as a work area for temporary storing data used in currently executing instructions and other kinds of data while the CPU is executing a program, communication circuit (not shown) for communicating between the controllers, and the like.

Communication lines connects between the controller C11 and the controller C21, between the controller C11 and the controller C31, and between the controller C11 and the controller C41, thus so-called master-slave configuration in which the controllers C21, C31, and C41 operate in accordance with instructions from the controller C11 is employed.

The main controller C10 also has the operating unit C12 and the print medium conveyance controller C13. The operating unit C12 uses a liquid crystal display (LCD) as a display unit, for example, and by providing a touch panel, made of transparent electrodes, on the surface of the LCD, instructions such as designation of colors and image density, selection such as switching of interfaces and the like, can be inputted from the touch panel. Further, the print medium conveyance controller C13 performs overall conveyance control of the print medium P.

The image controller C20 controls an interpreter C22 for interpreting signals inputted to the controller C21, an image processing unit C23 for performing various kinds of image processings, and a buffer memory C24 for storing image data. The interpreter C22, for example, connects to the host C50 via a general purpose parallel interface, such as a GPIB interface. Further, the interpreter C22 interprets image signals from the host C50 and transfer the interpreted signals to the image processing unit C23. The image processing unit C23 performs so-called image separation of separating the interpreted image signals into monochromatic image data representing images such as characters, texts, and graphic images and color image data representing images such as photographs and natural pictures. Further, it also performs black color extraction and color separation, resolution conversion of converting monochromatic data of 300 dpi into that of 600 dpi, smoothing processing, masking for color correction of printing ink used in the printhead 16, and so on. Then, monochromatic data of the characters, texts, graphic images, and so on, is sent to a monochromatic image buffer C26 and a color image buffer C25 and stored there, and the image data of photographs, natural pictures, and so on, is sent to the color image buffer C25 and stored there. The determination of a monochromatic image mode and a color image mode is performed at the black color extraction based on whether or not there is any color image data.

The electrophotograph controller C30 is controlled by the controller C31, and includes mechanically driven portion C32, a paper feeder C33 for supplying the print medium P, charger C34 for controlling charging and discharging on constructing elements which are necessary at forming an image in the electrophotograph method, an exposure unit C35, a transfer unit C37, a fixing unit C38, and a high voltage generator C39 for applying a high voltage to the charger C34, a developing unit C36, and the transfer unit C37 at proper timing.

Data stored in the monochromatic image buffer C26 is transferred to the controller C31, and an aforesaid series of image forming process in the electrophotograph method is executed.

The ink-jet controller C40 is controlled by the controller C41, and has a mechanically driven portion C42, a synchronizing delay memory C43, a paper feeder C44, a head driver C45, and a printhead operator C46. The synchronizing delay memory C43 receives image data from the color image buffer C25 and generates a timing signal which is necessary for compensating for the variance in timing due to the mechanical operation of the ink-jet controller C40 and for driving the printhead 16. The head driver C45 is an analog driving control circuit for driving the printhead 16, and internally generates a signal for driving the printhead 16 and makes the printhead operator C46 operate. Then the printhead 16 discharges ink of cyan (C), magenta (M), yellow (Y) and black (BK), thereby forming an image on print medium.

<First Embodiment>

(Resolutions of the Image Forming Units A and B)

In the first embodiment, with regard to resolution α of the image forming unit A capable of forming an image in higher resolution and to resolution β of the image forming unit B capable of forming an image in lower resolution than the resolution α, the image forming units A and B are constructed so as to hold the following relationship, resolution α=N×resolution β(N=an integer)

In the first embodiment, the resolution α is set to 600 dpi and the resolution β is set to 300 dpi, as described in the common embodiment, thus holding the above relationship (N=2).

Further, in this embodiment, the image forming apparatus of the present invention has two modes: one is a monochromatic image mode for forming a monochromatic image and the other is a color image mode for forming a color image. Whether image data sent from a host is monochromatic image data or color image data is determined, and the image forming unit A having higher resolution can be controlled so as to form an image at different resolution from that of the image forming unit B on the basis of the image data.

First, the monochromatic image mode in which only monochromatic image data is printed will be explained with reference to FIGS. 4A and 4B.

Figure 4B:
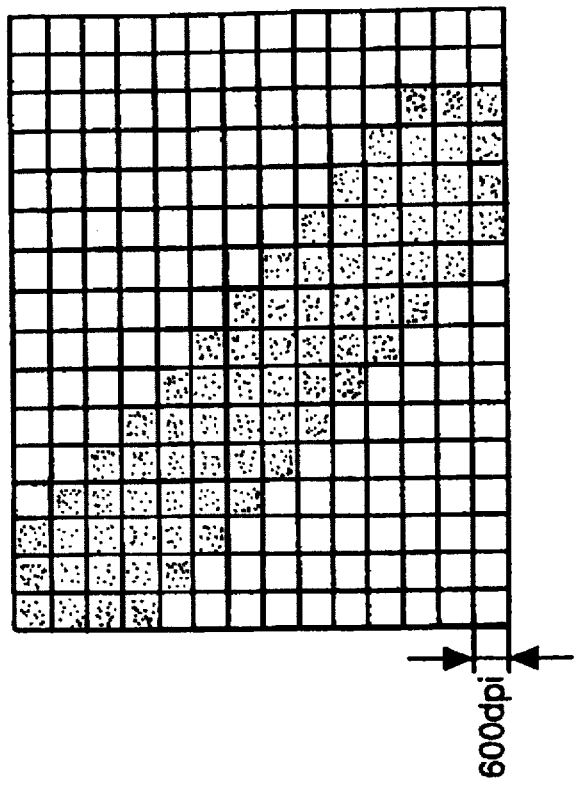
FIGS. 4A and 4B show pixel images when image forming is performed in a monochromatic image mode.
Figure 4A:
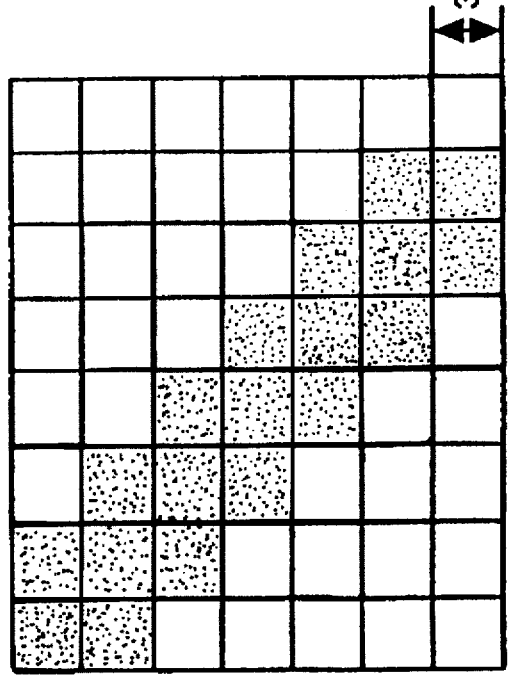

FIG. 4A shows monochromatic image data of resolution of 300 dpi transferred from the host, and FIG. 4B shows monochromatic image data after resolution conversion and smoothing processing is performed in the image processing unit C23. Here, each box in FIG. 4A represents one dot in resolution of 300 dpi, whereas each box in FIG. 4B represents one dot in resolution of 600 dpi. Accordingly, in the monochromatic image mode, resolution conversion and smoothing processing are applied to the data transferred from the host so that an image can be formed in higher resolution (600 dpi) on the print medium P by the image forming unit A, thereby performing high quality printing.

Next, a color image mode in which color image data is printed will be explained. In this mode, monochromatic portions are formed in resolution of 300 dpi on the print medium P by the image forming unit A on the basis of the image data of 300 dpi transferred from the host, then color portions are formed in resolution of 300 dpi on the print medium P by the image forming unit B. Accordingly, in the color image mode for processing image data which includes color image data and monochromatic image data, different resolution conversion from the aforesaid resolution conversion in the monochromatic image mode is performed.

Figure 5:
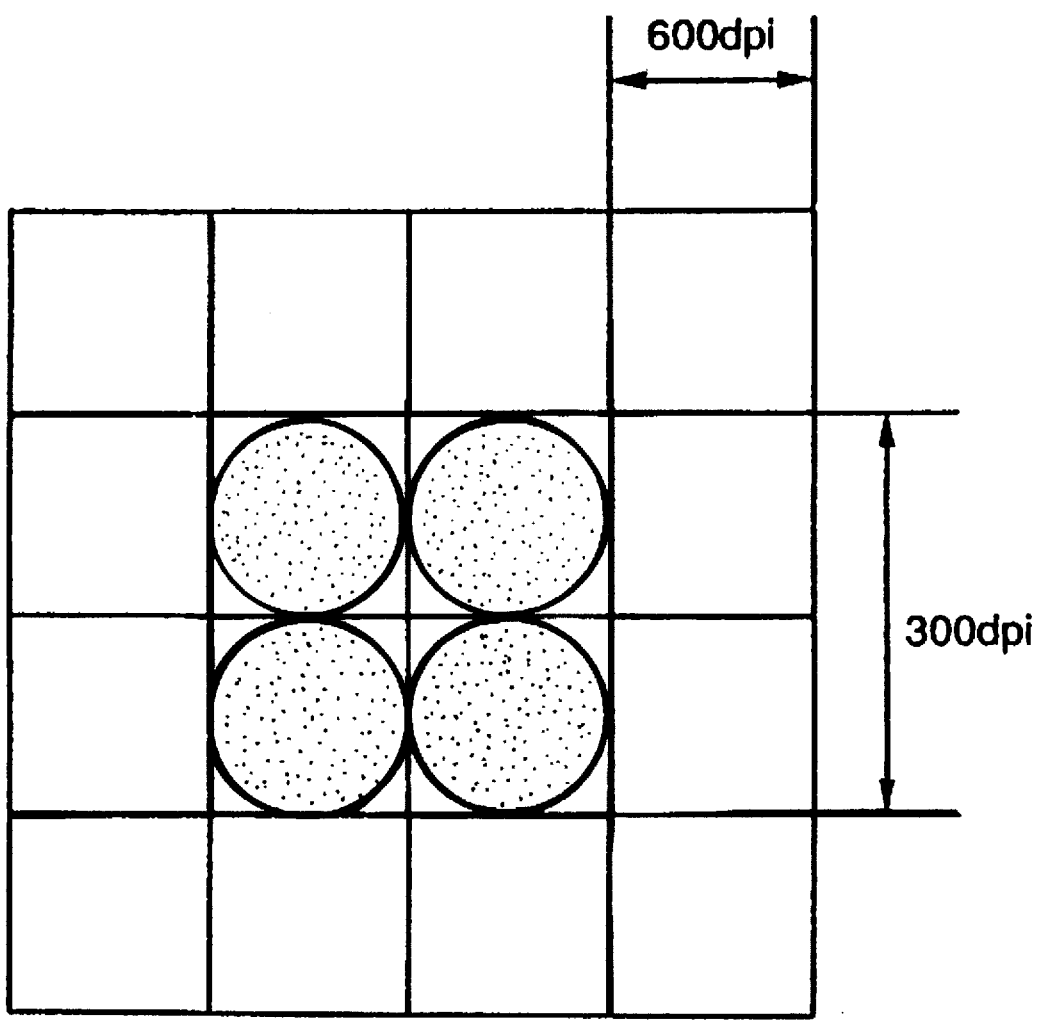
FIG. 5 is an explanatory view showing outline of resolution conversion process in a color image mode.

FIG. 5 shows outline of a resolution conversion in the color image mode. In FIG. 5, each square represents one dot in resolution of 600 dpi, whereas a square formed with bold lines represents one dot in resolution of 300 dpi. Dotted circles show spots which are exposed in the electrophotograph method. In this embodiment as shown in FIG. 5, by exposing four squares of a latent image in the resolution of 600 dpi which extends by two squares in the horizontal direction and by two squares in the vertical direction, a pixel of resolution of 300 dpi is represented. In this manner, the monochromatic image data of 300 dpi is converted to that of 600 dpi, and data processing is performed so that one pixel of resolution of 300 dpi consists of four pixels of resolution of 600 dpi (extends by two pixels in the horizontal (main scanning) direction and by two pixels in the vertical (subscanning) direction), as shown in FIG. 5. Then, an image based on the monochromatic image data is formed on the print medium P in resolution of 300 dpi by the image forming unit A, and an image based on the color image data is formed on the print medium P in resolution of 300 dpi by the image forming unit B.

Figure 6B:
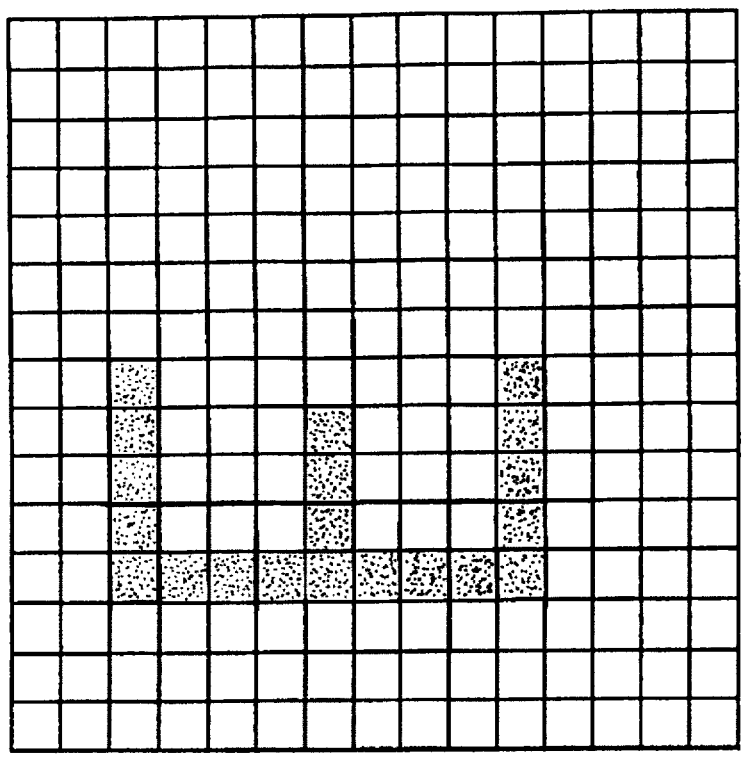
FIGS. 6A and 6B show pixel images when image forming is performed in the color image mode.
Figure 6A:
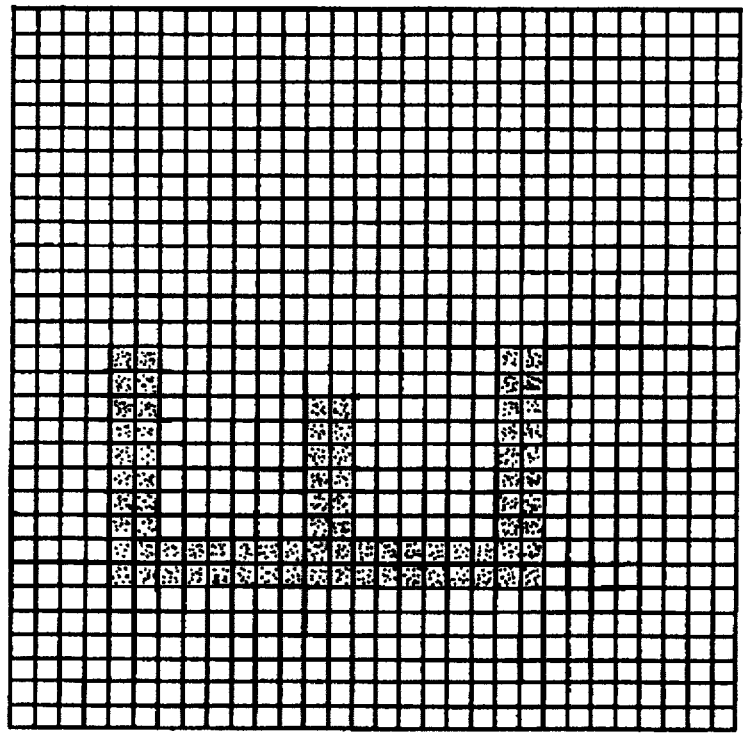

The image which is formed as above is shown in FIGS. 6A and 6B.

Here, FIG. 6A is a character expressed in resolution of the image forming unit A, whereas FIG. 6B is a character expressed in resolution of the image forming unit B. Further, each box of FIGS. 6A and 6B shows one pixel in the corresponding resolution. The shadowed portion in FIG. 6A is where toner is fixed, and the shadowed portion in FIG. 6B is where ink is discharged.

It is apparent by comparing FIG. 6A and FIG. 6B that, by aligning the position of the image formed by the image forming unit A having higher resolution (600 dpi) in which four pixels is equivalent to one pixel of lower resolution, to the position of the image formed by the image forming unit B having lower resolution (300 dpi), size of characters and intervals between characters are adjusted. For example, when a portion of a black color text is to be emphasized with colored characters by using the image forming unit B, it is possible to keep high printing quality. Further, since apparent resolutions are the same, if there is an area which is to be printed on the basis of both color image data and monochromatic image data, there will be no unprinted portion which shows the background color of the print medium at the border between black portion of the monochromatic image and colored portions of the color image.

Figure 7:
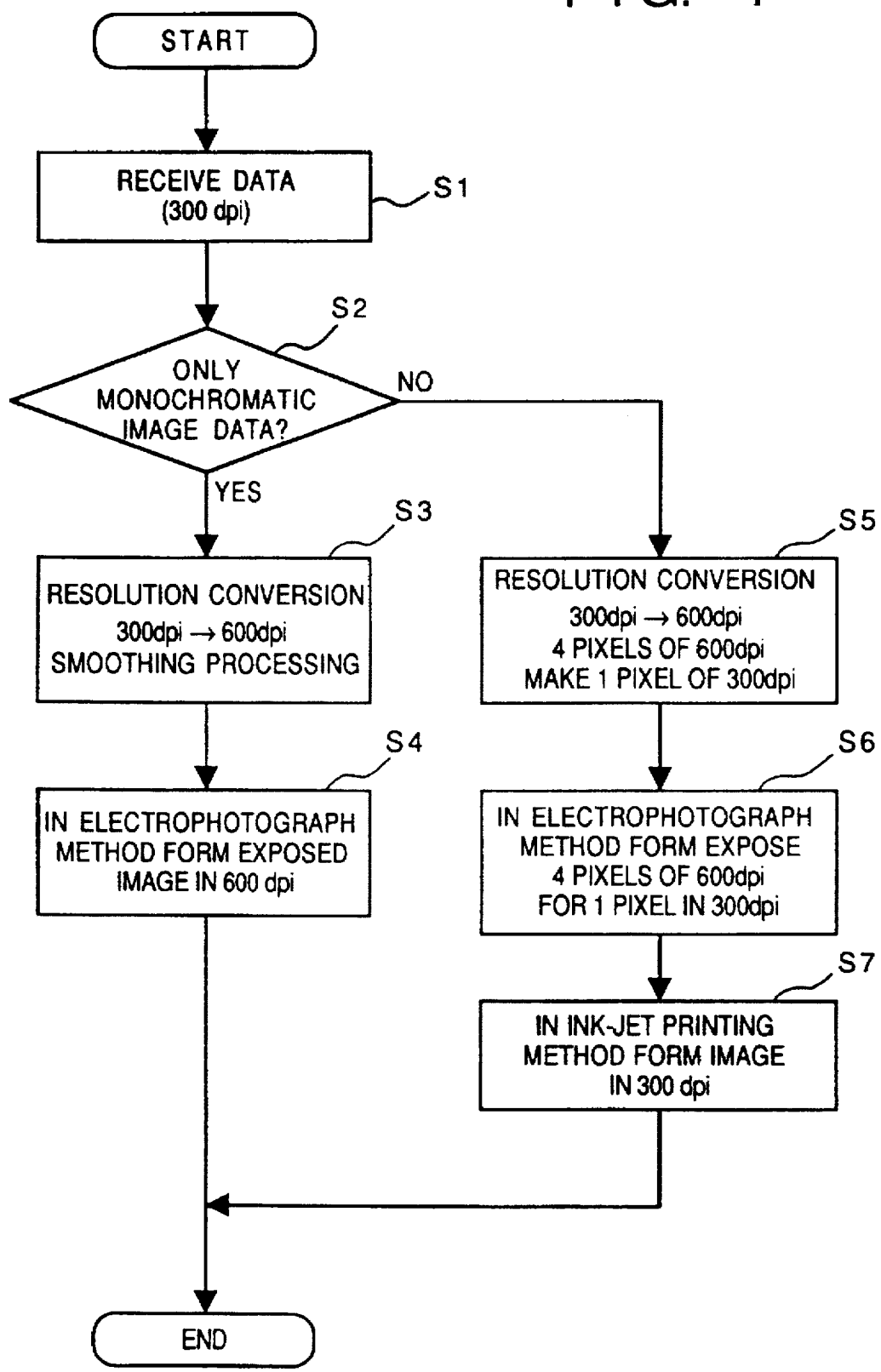
FIG. 7 is a flowchart for explaining image forming process according to the first embodiment.

Next, image forming process performed by a printing apparatus having the aforesaid configuration and functions will be explained referring to a flowchart in FIG. 7.

First at step S1, the interpreter C22 of the image controller C20 receives image data of 300 dpi which is sent from the host. Next at step S2, the image processing unit C23 interprets the received data and determines whether or not the data is for monochromatic image printing, in other words, whether or not it is necessary to perform image forming process only in the electrophotograph method.

If it is determined that a monochromatic image mode which is for performing only black and white image printing is suitable, the process moves to step S3 where the input monochromatic image data is applied with resolution conversion and smoothing processing in the image processing unit C23, thereby changing resolution from 300 dpi to 600 dpi. Thereafter, the process proceeds to step S4 where a black and white image of 600 dpi is formed on the basis of the data whose resolution is converted to 600 dpi, by the image forming unit A in the electrophotograph method.

In contrast, if it is determined that the color image mode which includes color image forming is suitable, the process proceeds to step S5. At step S5, the image processing unit C23 separates color image data from monochromatic image data. Thereafter, the monochromatic image data of 300 dpi is changed to that of 600 dpi so as to express one pixel of 300 dpi with four pixels of 600 dpi, as shown in FIG. 5. At subsequent step S6, a black and white image of 600 dpi is formed on the basis of the monochromatic image data, converted to that of 600 dpi, by the image forming unit A in the electrophotograph method. It should be noted that the image is formed so that four pixels of 600 dpi are equivalent to one pixel of 300 dpi, which differs from the previous case, the apparent resolution of an image formed on the print medium P is 300 dpi.

Next at step S7, the print medium P is conveyed to the image forming unit B and a color image is formed at 300 dpi.

As the image forming is completed as described above, the printed print medium P is ejected outside of the apparatus.

Therefore, according to the first embodiment, image data received from the host is analyzed, and it is determined whether image forming is to be performed in the electrophotograph method, or both the electrophotograph method and the ink-jet printing method, on the basis of the analyzed result. Especially, if the image data includes only black and white data, image forming can be performed in high resolution by using the electrophotograph method, thus it is advantageous in that a high quality image can be outputted at high speed.

Further, resolutions of two images formed in two different methods are adjusted and apparent resolutions of the two images become the same by representing one pixel of a lower resolution image with a plurality (squared integer number) of pixels of a higher resolution image. Therefore, if two images formed in the aforesaid two methods are combined on a single print medium, unevenness of dots does not occur, and as for a character image, for example, sizes of characters and intervals between characters become uniform. Thus, a high quality image in which characters form aligned lines can be obtained. Further, when a combination of a color image and a black and white image makes one character, e.g., a black and white character is surrounded with color modification, in order to emphasize the character, it is possible to form a high quality image having no unprinted area, i.e., an area where background color of print medium is come out, at borders between black portions of the black and white image and colored portions of the color image.

Note that, in this embodiment, resolution of image data transferred from the host is 300 dpi, however, the present invention is not limited to this. For example, it possible to print image data of 400 dpi, 600 dpi, or 1200 dpi.

<Second Embodiment>

In the first embodiment, by equating a plurality of pixels of higher resolution to one pixel of lower resolution, apparent resolutions of an image formed by the image forming unit A and of an image formed by the image forming unit B are made the same. In the second embodiment, by changing amount of light in an optical unit in the image forming unit A, namely by changing laser output, resolution of an image formed on an electrostatic drum is altered. Eventually, resolution of an image formed on print medium is changed, thereby making apparent resolutions of an image formed by the image forming unit A and image formed by the image forming unit B equal.

Figure 8:
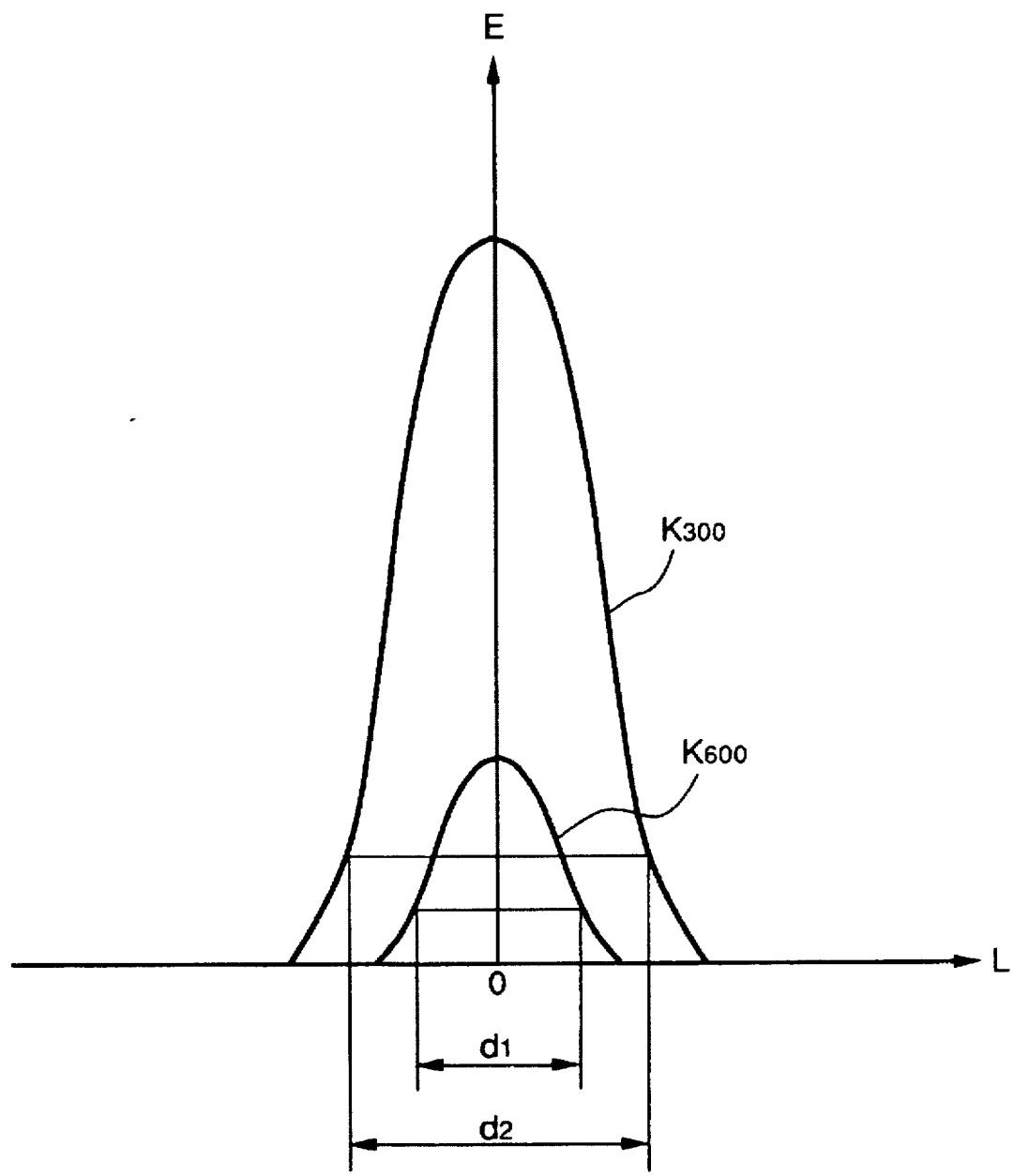
FIG. 8 is a graph showing energy distribution of a laser beam of the image forming unit A according to a second embodiment.

FIG. 8 is a graph showing energy distribution of a laser beam used in the image forming unit A according to the second embodiment.

Here, the horizontal axis L represents length in the scanning direction (in the direction parallel to the rotational direction of the electrostatic drum 7, namely subscanning direction (conveying direction of the print medium)) of the laser beam, and the vertical axis E represents energy intensity of the laser beam incidented on the electrostatic drum 7. Further, the 0 point in the L axis represents the center of energy intensity of a beam spot on the electrostatic drum 7. The energy intensity of the emitted laser beam has a form of Gaussian distribution with respect to the subscanning direction, as shown in FIG. 8. Therefore, it is possible to change diameters of beam spots in the subscanning direction by changing intensity of the laser beam.

In FIG. 8, $K_{300}$ shows an energy distribution when resolution is 300 dpi and d2 shows a diameter of a beam spot when 300 dpi. Further, $K_{600}$ shows an energy distribution when resolution is 600 dpi and d1 shows a diameter of a beam spot when 600 dpi. Therefore, by changing the beam spot diameter when an image is to be formed in 600 dpi (d1) to the beam spot diameter used when an image is to be formed in 300 dpi (d2), it is possible to equalize resolution in the conveyance direction of print medium to the resolution of the image forming unit B. Regarding resolution in the vertical direction (main scanning direction) with respect to the conveyance direction of print medium, it can be equalized with that of the image forming unit B by adjusting emission time period of the laser beam.

The aforesaid control can be performed when the controller C31 operates coupled with the exposure unit C35 so as to change amount of light of a laser beam and emission time period of the laser beam.

Figure 9:
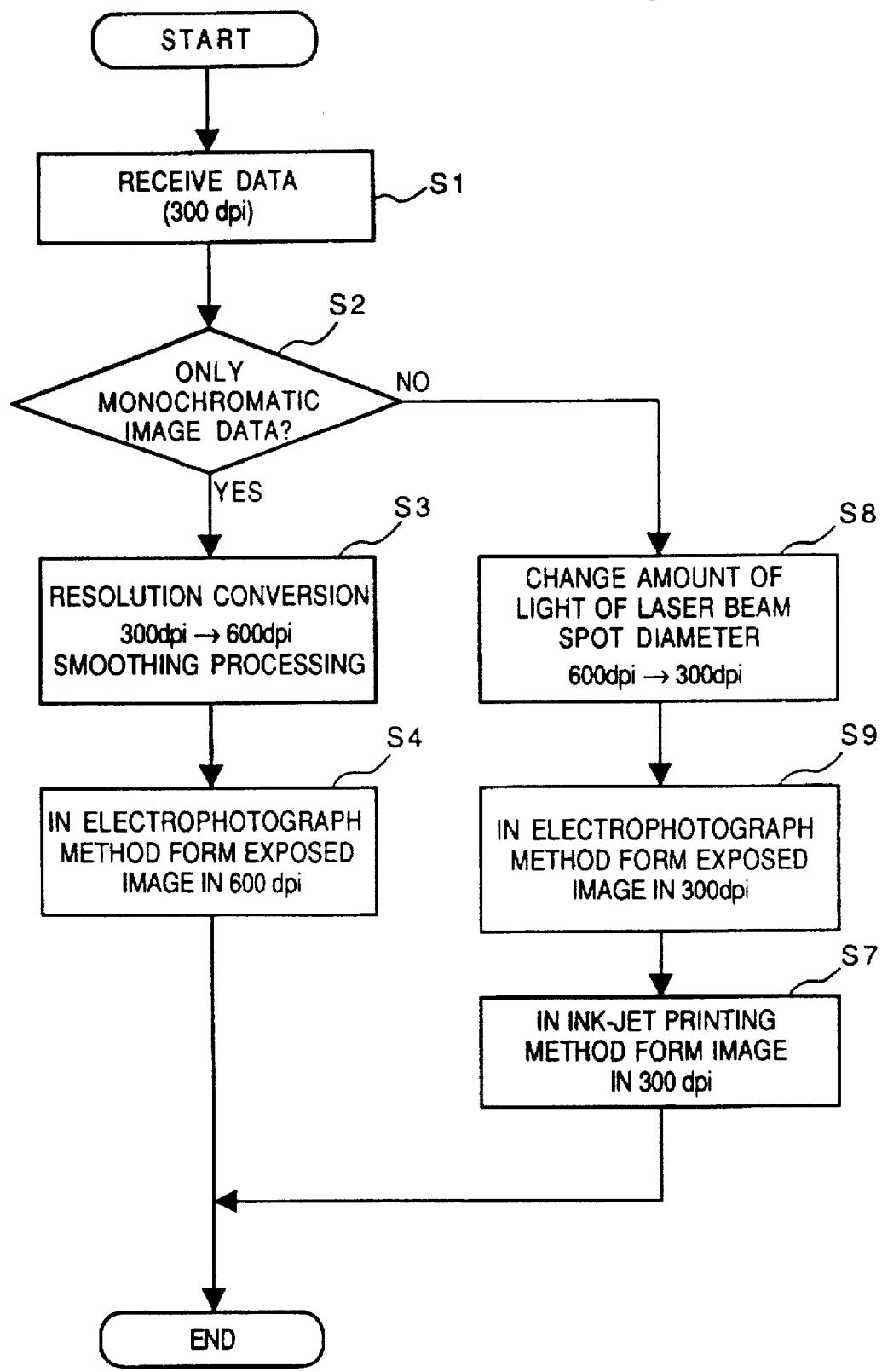
FIG. 9 is a flowchart for explaining image forming process according to the second embodiment.

Next, an image forming process according to the second embodiment will be explained with reference to a flowchart shown in FIG. 9. In FIG. 9, the same processing steps as those explained in the first embodiment are denoted by the same step reference numerals, and the explanations of those steps are omitted. Only specific processes to the second embodiment will be explained below.

First at step S2, when it is determined that input image data includes both color image data and monochromatic image data and that the input image data is to be processed in the color image mode, the process proceeds to step S8. At step S8, the image processing unit C23 first performs image separation in which the input image data is separated into monochromatic image data representing images such as characters, texts, and graphic images and color image data representing images such as photographs and natural pictures, black color extraction, color separation, and masking processing for color correction of printing ink used by the printhead 16. Then, the separated monochromatic image data of resolution of 300 dpi is sent to the monochromatic image buffer C26 and the color image buffer C25 and stored there, whereas the color image data of resolution of 300 dpi is sent to the color image buffer C25 and stored there. Meanwhile, the print medium P is fed from a cassette 1. When the print medium P arrives at the image forming unit A, the amount of light of a laser beam is increased so as to widen the beam spot diameter as shown in FIG. 8. Next at step S9, the image forming unit A forms a black and white image of 300 dpi by using the monochromatic image data of 300 dpi. Thereafter, the process moves to step S7 and performs the same process as described in the first embodiment.

Therefore, according to the second embodiment, by changing light amount and emission time period of a laser beam used in the electrophotograph method capable of forming an image in higher resolution, it is possible to control so as to equalize the resolution in the electrophotograph method to the resolution of the image forming unit employing the ink-jet printing method capable of forming an image in lower resolution. Accordingly, similarly to the first embodiment, if two images formed in the aforesaid two methods are combined on a single print medium, unevenness of dots does not occur, and as for a character image, for example, sizes of characters and intervals between characters become uniform. Thus, a high quality image in which characters form aligned lines can be obtained. Further, when a combination of a color image and a black and white image makes one character, e.g., a black and white character is surrounded with color modification, in order to emphasize the character, it is possible to form a high quality image having no unprinted area, i.e., an area where background color of print medium is come out, at borders between black portions of the black and white image and colored portions of the color image.

Further, the electrophotograph method is employed by an apparatus whose printing density is 600 dpi and the ink-jet printing method is employed by an apparatus whose printing density is 300 dpi, however, the present invention is not limited to this. For example, in a case where an apparatus whose printing density is 400 dpi employs the electrophotograph method and an apparatus whose printing density is 360 dpi employs the ink-jet printing method, it is possible to equalize the resolutions of the two apparatuses by changing the resolution in the electrophotograph method from 400 dpi to 360 dpi.

<Third Embodiment>

In the first and second embodiments, in the monochromatic image mode which is selected when input image data includes only monochromatic image data, an image of higher resolution is formed by the image forming unit A, whereas in the color image mode which is selected when input image data includes both monochromatic image data and color image data, resolution of an image formed by the image forming unit A is substantially lowered so as to equalize to the resolution of the image forming unit B.

In the third embodiment, one resolution is set to an integer multiple number of the other resolution, e.g., one resolution of an image formed on the print medium P by the image forming unit A is 600 dpi and the other resolution of an image formed on the print medium P by the image forming unit B is 300 dpi. Then, in the monochromatic image mode, an image is formed in resolution of 600 dpi by using the image forming unit A, whereas in the color image mode, a black portion (assuming that the monochromatic image is formed with black color) which shares its outline with a color portion are interpolated with the color image of 300 dpi, thereby preventing unevenness of dots which may occur when the two resolutions of the monochromatic image and the color image differ from each other. In general, regarding areas where color portions and black portions, having different resolutions from each other, share their outlines, the background color of print medium is prevented from showing out at the areas by interpolating the black portions with color image.

The aforesaid control can be achieved by adding interpolation process with a color image, which will be described below, as one of the image processings performed by the image processing unit C23 shown in FIG.

Note that a printing apparatus used in the third embodiment has a configuration that first forms an image on the print medium P, supplied from the cassette 1, by the image forming unit B which employs the ink-jet printing method, and second forms another image on the print medium P by the image forming unit A which employs the electrophotograph printing method. Configuration other than above is the same as the one explained in the common embodiment.

FIGS. 10A, 10B, 10C, 10D, 10E, and 10F are explanatory view conceptually showing interpolation process according to the third embodiment. In FIGS. 10A to 10F, dark shadowed portions represent a monochromatic image formed by the image forming unit A, and the hatched portions shows a color image formed by the image forming unit B. X represents one pixel in resolution of 300 dpi, and Y represents one pixel in resolution of 600 dpi.

Figure 10A:
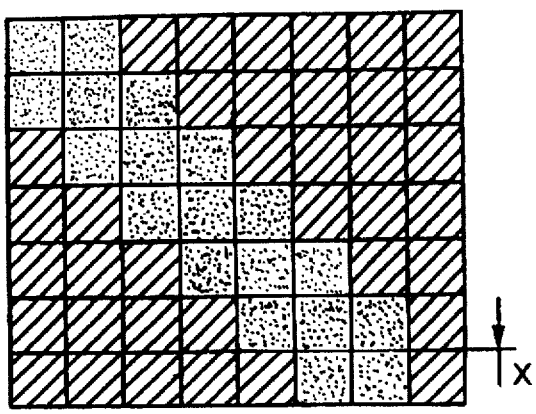
FIGS. 10A, 10B, 10C, 10D, 10E, and 10F are explanatory view conceptually showing interpolation process according to a third embodiment.

FIG. 10A shows an image based on image data of resolution of 300 dpi which is sent from the host, and FIG. 10 shows an image obtained as a result of image formation according to the third embodiment. As apparent from FIG. 10F, in a case where input data includes both color image data and monochromatic image data, an image is formed in 600 dpi in the electrophotograph method.

Figure 10D:
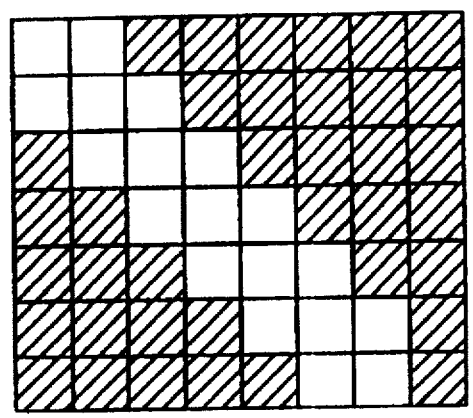
Figure 10B:
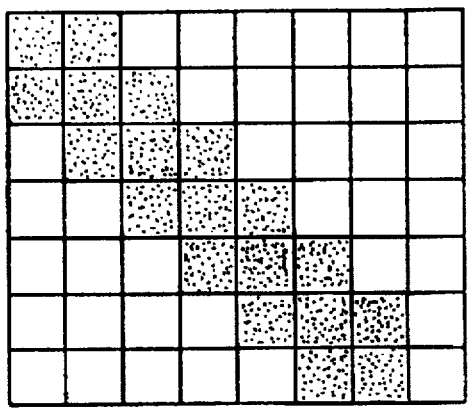
Figure 10E:
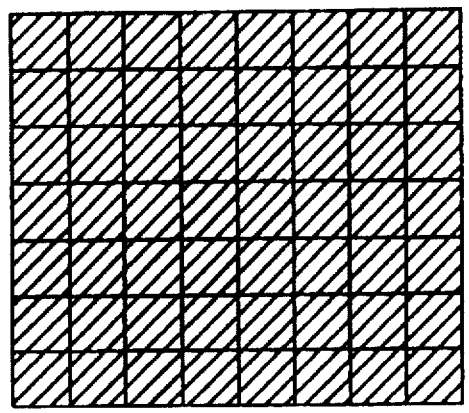
Figure 10C:
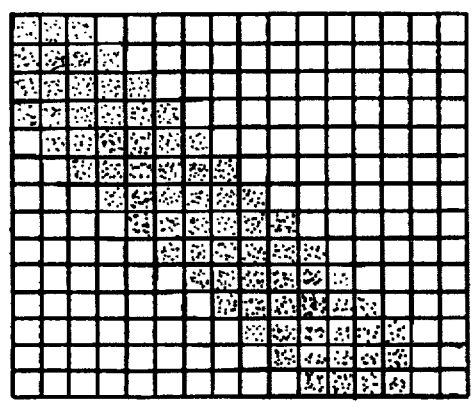
Figure 10F:
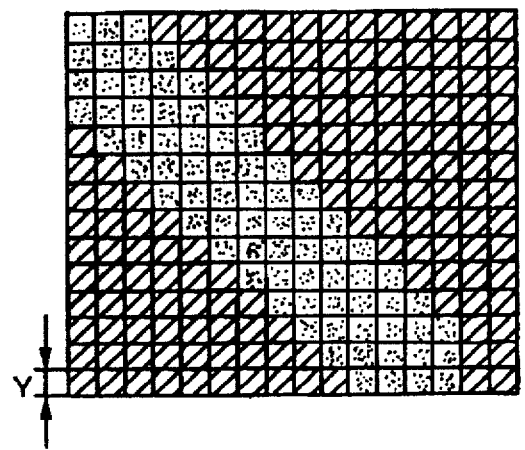

The image processing unit C23 generates intermediate image data as shown in FIGS. 10B, 10C, 10D, and 10E in order to obtain an image illustrated in FIG. 10F by performing image processings based on the image data shown in FIG. 10A.

First, the image processing unit C23 performs the image separation in which the input image data is separated into monochromatic image data representing images such as characters, texts, and graphic images and color image data representing images such as photographs and natural pictures, black color extraction, and color separation. FIG. 10B illustrates a black portion of monochromatic image data (assuming that the monochromatic image is formed with black color) of 300 dpi separated by the image processing unit C23. FIG. 10C illustrates black portion of monochromatic image data after the black portion of the monochromatic image data of 300 dpi is changed to that of 600 dpi, and applied with smoothing processing. The data illustrated in FIG. 10C is transferred to the monochromatic buffer C26 so as to be formed on the print medium P in resolution of 600 dpi by the image forming unit A.

Whereas, FIG. 10D illustrates color image data of 300 dpi separated by the image processing unit C23. This color image data of 300 dpi with absent of monochromatic image data is interpolated with color image data, and the obtained color image data is shown in FIG. 10E. Among mixture of the monochromatic image data and the color image data, portions of the monochromatic image data which are subject to the interpolation are black clusters in the monochromatic image data which share their outlines with colored portions of the color image data at least in one of the four directions, i.e., the upward, downward, right and left directions. More specifically, portions which are to be interpolated with color image data are black clusters in a monochromatic image sharing their outlines with colored portions of a color image, therefore, black portions of monochromatic image data which do not share their outlines with colored portions of color image data are not interpolated.

Thereafter, masking processing for color correction of printing ink used by the printhead 16 is performed on the interpolated color image data, and the processed color image data is transferred to the color image buffer C25.

Now, a monochromatic image is formed on the print medium P by the image forming unit A based on the monochromatic image data of 600 dpi stored in the monochromatic image buffer C26, whereas an color image is formed on the print medium P by the image forming unit B based on the color image data which has been applied with interpolation process as shown in FIG. 10E and which is stored in the color image buffer C25.

Thus, the print medium P is conveyed so as to pass the image forming unit B first, then the image forming unit A, thereby obtaining a high quality image having no unprinted portions at borders between the black portion of the black and white image and the colored portions of the color image.

According to the third embodiment, input image data is first separated into color image data and monochromatic image data, and black portions of the monochromatic image which share their outlines with color portions of the color image are interpolated with color image data. Then, a color image is formed on a print medium based on the interpolated color image data by an image forming unit employing the ink-jet printing method, whereas the separated monochromatic image data is resolution-converted into a higher resolution and a monochromatic image is formed on the basis of the resolution-converted monochromatic image data by the image forming unit employing the electrophotograph method on the print medium on which the color image has been already printed. Accordingly, it is possible to obtain a high quality image having no unprinted portions at borders between the black portions of the black and white image and the colored portions of the color image.

Note that, in the third embodiment, resolution of the image forming unit A is 600 dpi and resolution of the image forming unit B is 300 dpi, namely a case where the image forming unit A has doubled resolution of that of the image forming unit B, however, the present invention is not limited to this. For example, resolution of an image forming unit employing the electrophotograph method can be 800 dpi and resolution of an image forming unit employing the ink-jet printing method can be 200 dpi, which is a case where the resolutions of the former unit is four times as high as that of the latter unit. Further, resolution of one image forming unit is integer number of times as high as resolution of the other image forming unit, three times, for instance.

<Fourth Embodiment>

In the third embodiment, in input image data including both monochromatic image data and color image data, portions which are subject to interpolation is entire black clusters of monochromatic image which share their outlines with colored portions of a color image at least in one of the four directions, i.e., upward, downward, right and left directions. More specifically, portions which is to be interpolated are the entire black clusters in the monochromatic image which share their outlines with the colored portions of the color image.

In the fourth embodiment, areas to be interpolated by the image forming unit B are black pixels of black clusters which touch colored portions of a color image at least in one of the upward, downward, right and left directions, i.e., four directions, and in which a part of one pixel at 300 dpi was modified as a result of the resolution conversion and/or smoothing processing performed in the image forming unit A. Therefore, comparing to the third embodiment, portions to be interpolated are reduced in order to reduce the amount of ink to be consumed as well as it is possible to prevent unevenness of dots which may occur when the two resolutions of the monochromatic image and of the color image differ from each other. Further, the background color of print medium is prevented from showing out at borders by interpolating the black pixels of the monochromatic image at borders between the black portion of the monochromatic image and the colored portions of the color image with a color image.

The aforesaid control can be realized by adding interpolation process, described below, which interpolates with color image data to the image processings performed by image processing unit C23 in FIG. 3.

Note that a printing apparatus to be used in the fourth embodiment, similarly to the one described in the third embodiment, has a configuration that first forms an image on the print medium P, supplied from the cassette 1, by the image forming unit B which employs the ink-jet printing method, and second forms another image on the print medium P by the image forming unit A which employs the electrophotograph printing method. Configuration other than above is the same as the one explained in the common embodiment.

FIGS. 11A, 11B, 11C, 11D, 11E, and 11F are explanatory view conceptually showing interpolation process according to the fourth embodiment. In FIGS. 11A to 11F, dark shadowed portions represent a monochromatic image formed by the image forming unit A, and the hatched portions shows a color image formed by the image forming unit B. X represents one pixel in resolution of 300 dpi, and Y represents one pixel in resolution of 600 dpi.

Figure 11A:
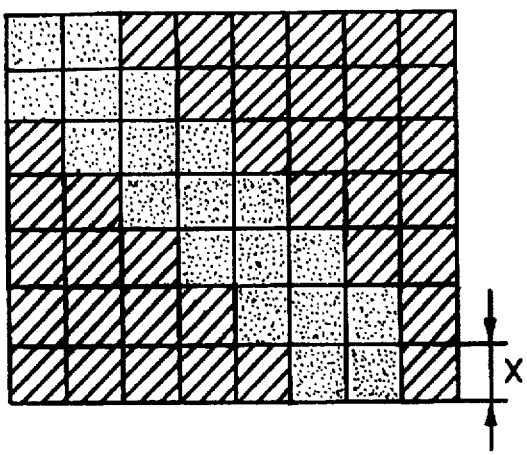
FIGS. 11A, 11B, 11C, 11D, 11E, and 11F are explanatory view conceptually showing interpolation process according to a fourth embodiment.
Figure 11D:
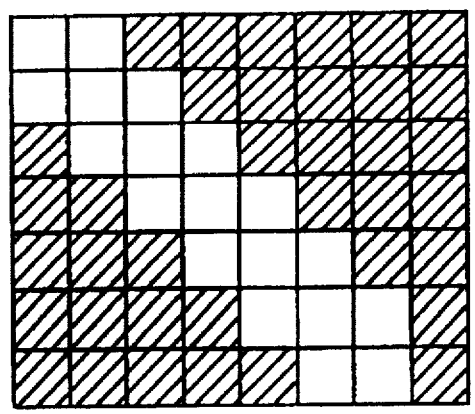
Figure 11B:
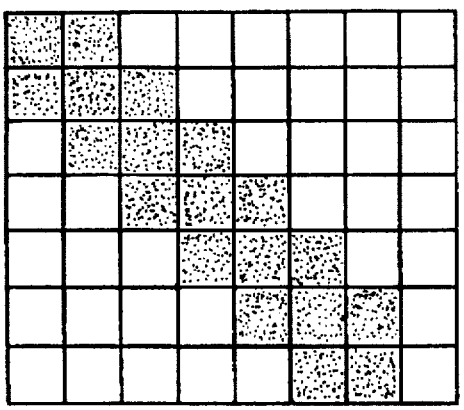
Figure 11E:
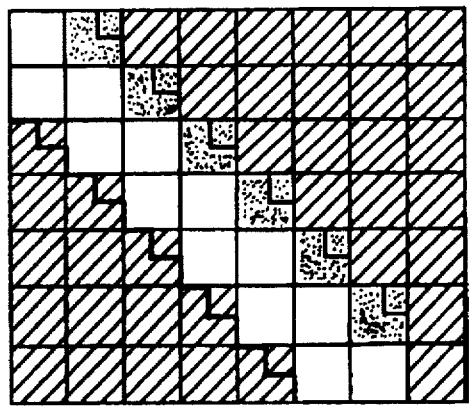
Figure 11C:
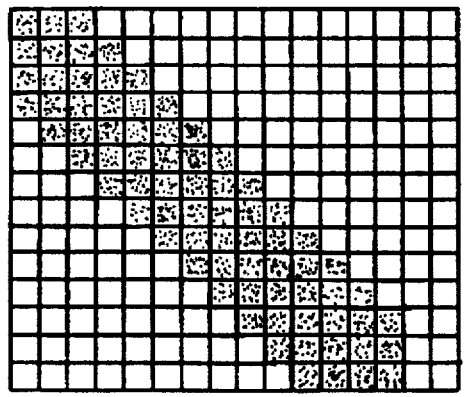
Figure 11F:
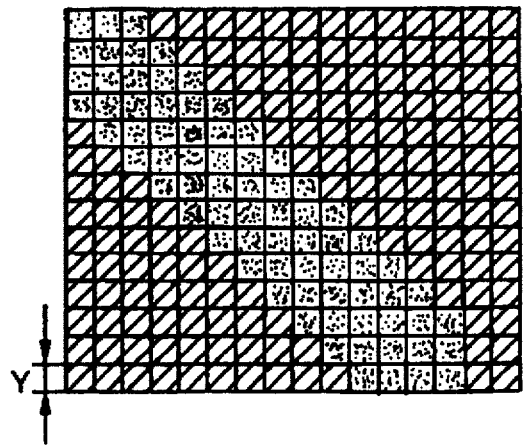

FIG. 11A shows an image based on image data of resolution of 300 dpi which is sent from the host, and FIG. 11F shows an image obtained as a result of image formation according to the fourth embodiment. As apparent from FIG. 11F, in a case where input data includes both color image data and monochromatic image data, an image is formed in 600 dpi in the electrophotograph method.

The image processing unit C23 generates intermediate image data as shown in FIGS. 11B, 11C, 11D, and 11E in order to obtain an image illustrated in FIG. 11F by performing image processings based on the image data shown in FIG. 11A.

First, the image processing unit C23 performs the image separation in which the input image data is separated into monochromatic image data representing images such as characters, texts, and graphic images and color image data representing images such as photographs and natural pictures, black color extraction, and color separation. FIG. 11B illustrates a black portion of monochromatic image data (assuming that the monochromatic image is formed with black color) of 300 dpi separated by the image processing unit C23. FIG. 11C illustrates black portion of monochromatic image data after the black portion of the monochromatic image data of 300 dpi is changed to that of 600 dpi, and applied with smoothing processing. The data illustrated in FIG. 11C is transferred to the monochromatic buffer C26 so as to be formed on the print medium P in resolution of 600 dpi by the image forming unit A.

Whereas, FIG. 11D illustrates color image data of 300 dpi separated by the image processing unit C23. This color image data of 300 dpi with absent of monochromatic image data is interpolated with color image data, and the obtained color image data is shown in FIG. 11E. In FIG. 11E, bold lines shows borders between the color image data and the black portion of the monochromatic image, shown in FIG. 11C, which is converted to resolution of 600 dpi and applied with smoothing processing.

According to the fourth embodiment, among empty area, shown in FIG. 11D, representing existence of the black portion of the monochromatic image, the image forming unit C23 interpolate only pixels through which the bold lines, shown in FIG. 11E, pass with color image data. Those pixels are of resolution of 300 dpi which are chipped off as result of resolution conversion and smoothing processing. These interpolated pixels are expressed as dotted pixels in FIG. 11E.

Thereafter, masking processing for color correction of printing ink used by the printhead 16 is performed on the interpolated color image data, and the processed color image data is transferred to the color image buffer C25.

Now, a monochromatic image is formed on the print medium P by the image forming unit A based on the monochromatic image data of 600 dpi stored in the monochromatic image buffer C26, whereas an color image is formed on the print medium P by the image forming unit B based on the color image data which has been applied with interpolation process as shown in FIG. 11E and which is stored in the color image buffer C25.

Thus, the print medium P is conveyed so as to pass the image forming unit B first, then the image forming unit A, thereby a high quality image, as shown in FIG. 11F, having no unprinted portions at borders between the black portion of the black and white image and the colored portions of the color image can be obtained as well as consumed amount of ink used in the image forming unit B can be reduced.

According to the fourth embodiment, comparing to the third embodiment, consumed amount of ink used in an image forming unit employing the ink-jet printing method is reduced. Furthermore, a high quality image having no unprinted portions at borders between black portions of a black and white image and colored portions of a color image can be obtained, as in the case of the third embodiment.

<Fifth Embodiment>

In the first to fourth embodiments, a laser exposure method is used as an exposure method of the image forming unit A employing the electrophotograph method. In the fifth embodiment, an LED exposure method is used as the exposure method. Accordingly, the image forming unit A is constructed so that a semiconductor LED is used as a light source, and the light emitted from the LED is incidented on the electrostatic drum, thereby forming a latent image on it. Further, a printing apparatus to be used in the fifth embodiment, similarly to the one described in the third and fourth embodiments, has a configuration that first forms an image on the print medium P, supplied from the cassette 1, by the image forming unit B which employs the ink-jet printing method, and second forms another image on the print medium P by the image forming unit A which employs the electrophotograph printing method. Configuration other than above is the same as the one explained in the common embodiment.

Figure 12:
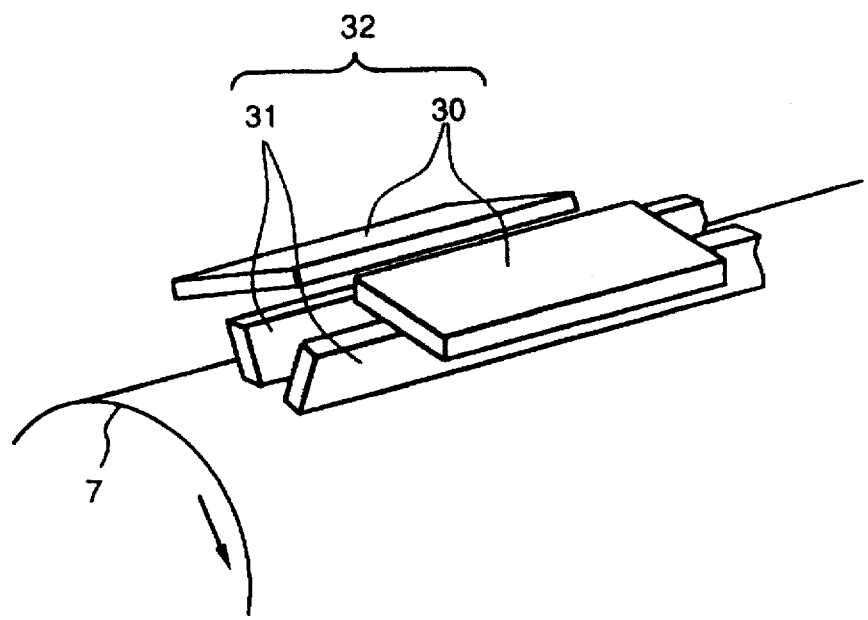
FIG. 12 is an external view illustrating a configuration of an exposure unit of the image forming unit A according to a fifth embodiment.

FIG. 12 is a three-dimensional external view illustrating a configuration of an exposure unit of the image forming unit A according to the fifth embodiment. As shown in FIG. 12, the exposure unit 32 consists of an LED array substrate 30 and focusing lens array 31. The LED array substrate 30 emits light in accordance with image data, and the emitted light is converged by the focusing lens array 31 and incidents on the electrostatic drum 7.

Another feature of the fifth embodiment is that smoothing processing is applied to pixel data of resolution of 600 dpi. In the process, one pixel of 600 dpi is divided into four parts, and some of the divided parts are exposed. This control is performed by using the feature that size of dots in the conveying direction of a print medium become smaller by adjusting the emission time of the LED. Accordingly, further higher quality image can be formed. However, this smoothing processing does not change the resolution in the conveyance direction of the print medium. Rather, it expresses an image with smoother curves by changing spot diameters of light.

Figure 13:
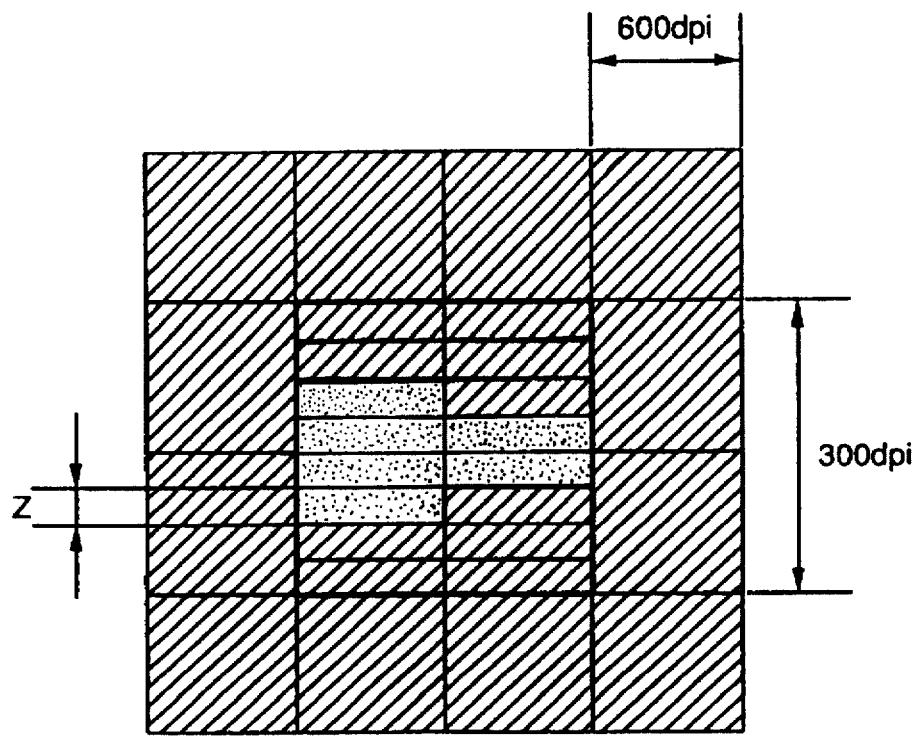
FIG. 13 is a diagram for conceptually explaining smoothing processing according to the fifth embodiment.
Figure 14:
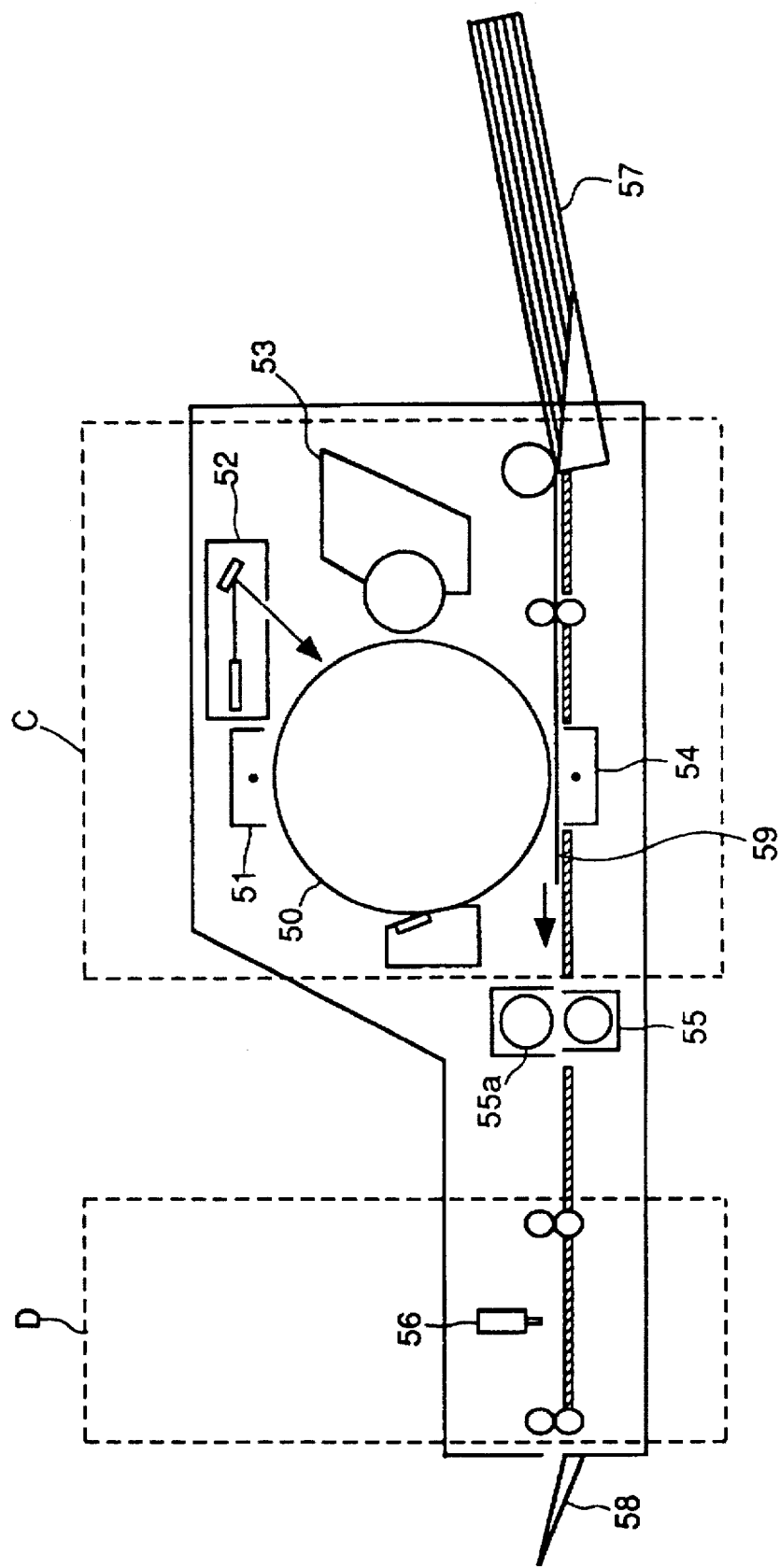
FIG. 14 is a cross-sectional view illustrating a configuration of a conventional printing apparatus having two image forming units.
Figure 15B:
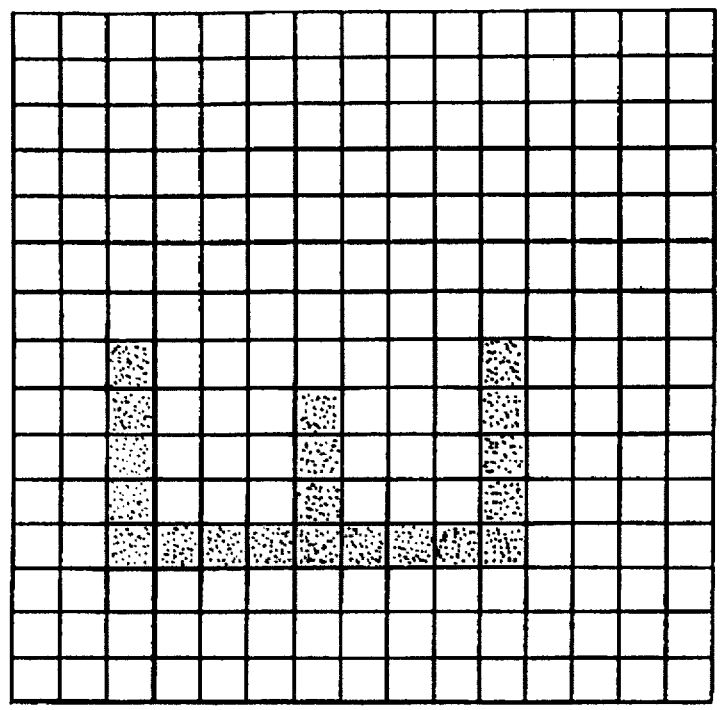
FIGS. 15A and 15B are explanatory views showing constructions of pixel dots formed by the two conventional image forming units having different resolutions from each other.
Figure 15A:
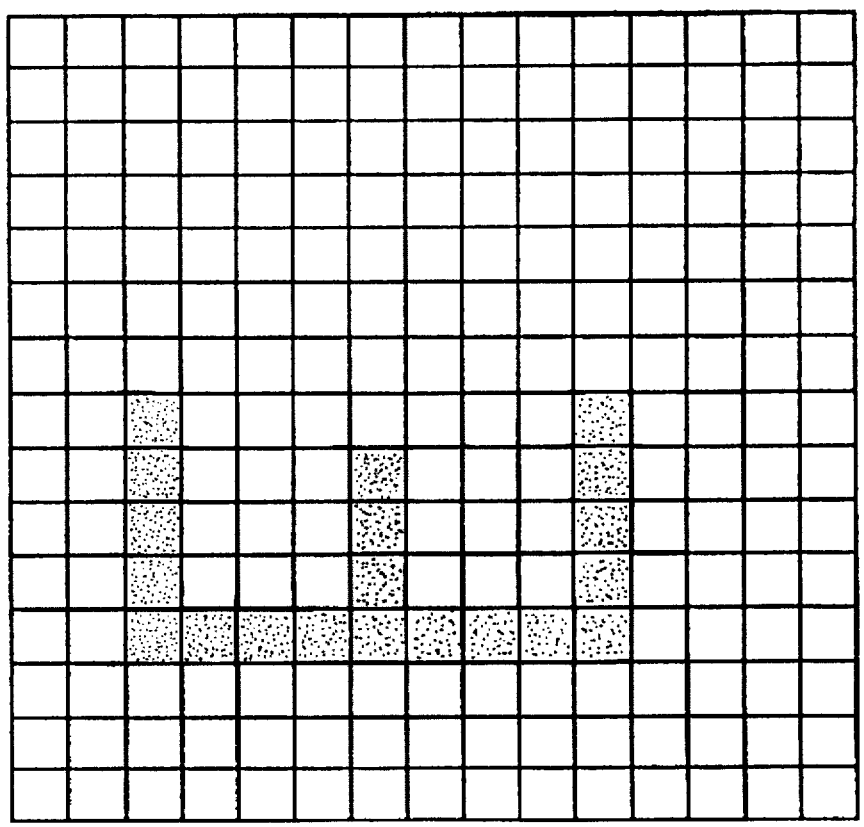

FIG. 13 illustrates a construction of dots obtained after smoothing processing according to the fifth embodiment. In FIG. 13, Z shows one-fourth of a pixel of 600 dpi, and small squares expressed with thin lines are pixels of 600 dpi, and a large square expressed with bold lines is a pixel of 300 dpi. Each rectangle filled with small dots shows a smallest unit which is to be exposed in the LED exposure method according to the fifth embodiment, and the hatched area shows a portion which is formed in the ink-jet printing method. Further, in the hatched area, color image data is interpolated in such the manner that explained in the third or fourth embodiment so as to prevent the background color of print medium from showing out at borders between the black portion of the monochromatic image and the colored portion of the color image, which may occur when the image forming units A and B have different resolution from each other.

The aforesaid control can be achieved by performing interpolation with the color image and smoothing processing as described above, by the image processing unit C23 and by changing the exposure method in the image forming unit A from the laser exposure method to the LED exposure method.

According to the fifth embodiment, therefore, an image is formed in such a manner that the LED exposure method is used in an image forming unit employing the electrophotograph method, a pixel of 600 dpi is further divided into smaller parts, and each divided part is exposed as a unit. Thus, it is possible to form a further higher quality image according to the fifth embodiment comparing to the first to fourth embodiments.

Note that, in the fifth embodiment, resolution of the image forming unit A is 600 dpi, that of the image forming unit B is 300 dpi, and smoothing processing is performed by a unit of quarter of pixel data of 600 dpi, however, the present invention is not limited to this. For example, it is possible to perform the smoothing processing by half pixel, one-sixth pixel, and so on.

Further, in the fifth embodiment, a case where the LED exposure method is used in the image forming unit employing the electrophotograph method is explained, however, the present invention is also not limited to this. For example, the laser exposure method can be used, needless to say.

Furthermore, in the first to fifth embodiments, the electrophotograph method and the ink-jet printing method are used as a plurality of different image forming units, however, the present invention is not limited to these methods. For example, it is possible to employ a thermosensible paper printing method and thermal transfer printing method.

Further, in the image forming unit B expressed in the first to fifth embodiments, the ink-jet printing method is used as an image forming method. Regarding this ink-jet printing method, it is preferable to construct the image forming unit as follow.

Namely, a printing apparatus employing the ink-jet printing method is preferably constructed so as to send an electric current to an electrothermal transducer in accordance with a printing signal, apply thermal energy to ink by the electrothermal transducer so that ink is discharged to print through a discharge opening by growth and shrinkage of bubbles by utilizing film boiling of the ink.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention.

In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave caused by heat energy in correspondence with a discharge portion. This is because printing can be performed precisely and effectively regardless of a configuration of a printhead to be used, according to the present invention.

Furthermore, the present invention can be effectively applied to a full line type printhead having a length corresponding to the width of a maximum print medium which can be printed by the printer.

As the full line type printhead, either the arrangement which satisfies the full-line length by combining a plurality of printheads as disclosed in the above specification or the arrangement as an integratedly assembled single printhead can be used.

In addition, in the above-mentioned serial type printhead, any one of a printhead integrated in a carriage, an exchangeable chip type printhead which can be electrically connected to the apparatus main unit and can receive ink from the apparatus main unit upon being mounted on the apparatus main unit and a cartridge type printhead in which an ink tank is integrally arranged on the printhead itself can be applicable to the present invention.

It is preferable to add recovery means for the printhead, preliminary auxiliary means, and the like provided as an arrangement of the image forming unit employing the ink-jet printing method described in the aforesaid first to fifth embodiments since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Regarding the type of a printhead and the number of printheads installed in a carriage, it can be arranged in a printer that not only a single printhead corresponding to a single color but also a plurality of printhead, each corresponding to different colors or different ink densities are provided.

More specifically, as a printing mode of the printer, not only a printing mode using only a primary color such as black or the like, but also at least one of a multi-color mode using a plurality of different colors of a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range. In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a print medium, or the like is applicable to the present invention.

In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the aforesaid image forming unit may be used in the form of a copying machine combined with a reader, and the like, or a facsimile apparatus having a transmission/reception function in addition to an image output terminal of an information processing equipment such as a computer.

Further, the present invention does not limit image formation sequence of the two kinds of image forming methods. For example, an image can be formed in the electrophotograph method first, then in the ink-jet printing method. Or conversely, an image can be formed in the ink-jet printing method first, then in the electrophotograph method.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims. Furthermore, the invention is applicable also to a case where the invention is embodied by supplying a program to a system or apparatus. In this case, a storage medium, storing a program according to the invention, constitutes the invention. The system or apparatus installed with the program read from the medium realizes the functions according to the invention.

What is claimed is:

1. An image forming apparatus comprising:

input means for inputting image data from an external device;

analyzing means for analyzing kinds of image data included in the image data inputted by said input means;

first image forming means for forming an image in first resolution in a first image forming method by using the image data inputted by said input means;

second image forming means for forming another image in second resolution which is different from the first resolution in a second image forming method by using the image data inputted by said input means;

selecting means for controlling to perform image forming by selecting either said first image forming means or both of said first and second image forming means; and image conversion means for performing image conversion so that a size of an image formed by said first image forming means is visually the same as a size of an image formed by said second image forming means when the image forming is to be performed by using both of said first and second image forming means in accordance with a selection result by said selecting means.

2. The apparatus according to claim 1, wherein said first resolution is multiple number of said second resolution by an integer (n), and said image conversion means includes resolution conversion means for converting resolution of the input image data used in said first image forming means so that $n^2$ pixels formed by said first image forming means are equalized to a single pixel formed by said second image forming means.

3. The apparatus according to claim 1, wherein said first image forming method is an electrophotograph method, and said first image forming means includes:

light emitting means for forming a latent image by illuminating a light beam on an electrostatic drum on the basis of the input image data; and light beam adjusting means for changing beam spot diameter of the light beam to a diameter corresponding to said second resolution when image forming is performed by both of said first and second image forming means.

4. The apparatus according to claim 3, wherein said light beam is a laser beam or light emitted by an LED.

5. The apparatus according to claim 1, wherein, in a case where the input image data includes only monochromatic image data, said selecting means selects said first image forming means.

6. The apparatus according to claim 1, wherein, in a case where the input image data includes both monochromatic image data and color image data, said selecting means selects both of said first and second image forming means.

7. The apparatus according to claim 6, further comprising:

separation means for separating the input image data into the monochromatic image data and the color image data; and distribution means for distributing the monochromatic image data separated by said separation means to said first image forming means whereas the color image data separated by said separation means to said second image forming means.

8. The apparatus according to claim 7, wherein a color image is formed by said second image forming means on a print medium on which a monochromatic image is formed by said first image forming means.

9. The apparatus according to claim 8, further comprising interpolation means for interpolating border portions between the monochromatic image and the color image with the color image in a case where the monochromatic image formed by said first image forming means shares its outline with the color image formed by said second image forming means.

10. The apparatus according to claim 1, wherein said second image forming method is an ink-jet printing method, and said second image forming means has a printhead for printing on a print medium.

11. The apparatus according to claim 10, wherein said printhead includes an ink-jet printhead for performing printing by discharging an ink.

12. The apparatus according to claim 10, wherein said printhead is a printhead for discharging an ink by utilizing heat energy, and includes heat energy transducers for generating heat energy to be applied to the ink.

13. The apparatus according to claim 12, wherein the ink is discharged from a discharging opening by utilizing film boiling of the ink caused by heat energy applied by said heat energy transducers.

14. The apparatus according to claim 1, wherein the first and second image forming methods include a thermal transfer printing method or a thermosensible paper printing method.

15. An image forming apparatus comprising:

input means for inputting image data from an external device;

analyzing means for analyzing kinds of image data included in the image data inputted by said input means;

first image forming means for forming an image in first resolution in a first image forming method by using the image data inputted by said input means; and second image forming means for forming another image in second resolution which is different from the first resolution in a second image forming method by using the image data inputted by said input means, wherein said first resolution is multiple number of said second resolution by an integer.

16. The apparatus according to claim 15, wherein said first image forming method is an electrophotograph method, and said first image forming means includes:

light emitting means for forming a latent image by illuminating a light beam on an electrostatic drum on the basis of the input image data; and light beam adjusting means for changing beam spot diameter of the light beam to a diameter corresponding to said second resolution when image forming is performed by both of said first and second image forming means.

17. The apparatus according to claim 16, wherein said light beam is a laser beam or light emitted by an LED.

18. The apparatus according to claim 15, wherein, in a case where the input image data includes only monochromatic image data, said first image forming means is used.

19. The apparatus according to claim 15, wherein, in a case where the input image data includes both monochromatic image data and color image data, both of said first and second image forming means are used.

20. The apparatus according to claim 19, further comprising:

separation means for separating the input image data into the monochromatic image data and the color image data; and distribution means for distributing the monochromatic image data separated by said separation means to said first image forming means whereas the color image data separated by said separation means to said second image forming means.

21. The apparatus according to claim 20, wherein a color image is formed by said second image forming means on a print medium on which a monochromatic image is formed by said first image forming means.

22. The apparatus according to claim 21, further comprising interpolation means for interpolating border portions between the monochromatic image and the color image with the color image in a case where the monochromatic image formed by said first image forming means shares its outline with the color image formed by said second image forming means.

23. The apparatus according to claim 15, wherein said second image forming method is an ink-jet printing method, and said second image forming means has a printhead for printing on a print medium.

24. The apparatus according to claim 23, wherein said printhead includes an ink-jet printhead for performing printing by discharging an ink.

25. The apparatus according to claim 23, wherein said printhead is a printhead for discharging an ink by utilizing heat energy, and includes heat energy transducers for generating heat energy to be applied to the ink.

26. The apparatus according to claim 25, wherein the ink is discharged from a discharging opening by utilizing film boiling of the ink caused by heat energy applied by said heat energy transducers.

* * * * *